United States Patent
Takiguchi et al.

(10) Patent No.: US 6,711,313 B2
(45) Date of Patent: Mar. 23, 2004

(54) CDMA ENCODER-DECODER, CDMA COMMUNICATION SYSTEM, WDM-CDMA COMMUNICATION SYSTEM

(75) Inventors: Koichi Takiguchi, Mito (JP); Katsunari Okamoto, Mito (JP); Tomohiro Shibata, Mito (JP); Masao Kato, Mito (JP); Takashi Goh, Mito (JP)

(73) Assignee: Nippon Telegraph and Telephone Corporation (JP)

( * ) Notice: Subject to any disclaimer, the term of this patent is extended or adjusted under 35 U.S.C. 154(b) by 186 days.

(21) Appl. No.: 09/753,565

(22) Filed: Jan. 4, 2001

(65) Prior Publication Data

US 2001/0010739 A1 Aug. 2, 2001

(30) Foreign Application Priority Data

Jan. 6, 2000 (JP) ......................................... 2000-001046

(51) Int. Cl.[7] ................................................. G02B 6/26
(52) U.S. Cl. .............................. 385/15; 385/16; 385/27
(58) Field of Search .............................. 385/15, 16, 24, 385/27; 359/136, 140

(56) References Cited

U.S. PATENT DOCUMENTS

| | | | | |
|---|---|---|---|---|
| 5,414,548 A | * | 5/1995 | Tachikawa et al. | ......... 359/130 |
| 6,049,640 A | * | 4/2000 | Doerr | ......................... 385/15 |
| 6,249,620 B1 | * | 6/2001 | Simeonidou et al. | ......... 385/16 |

FOREIGN PATENT DOCUMENTS

| | | | | |
|---|---|---|---|---|
| KR | 2001026469 A | * | 4/2001 | ............ H04J/14/00 |
| KR | 2001054320 A | * | 7/2001 | ............. H04L/9/00 |
| KR | 2001054321 A | * | 7/2001 | ........... H04B/10/00 |
| WO | WO 00/70804 | * | 11/2000 | ............ H04J/13/00 |

OTHER PUBLICATIONS

Lee C., Zhong, S., Lin, X. and Chen, Y. Proposed Planar Lightwave Circuit Design of Programmable Optical CDMA Spectral Encoder/Decoder Using Array–Waveguide Grating, IEEE 1999.*

Kim, Sangin. Cyclic Optical Encoders/Decoders for Compact Optical CDMA Networks, IEEE Photonics Tech. Letters, vol 12 n 4, pp 428–430, Apr. 2000.*

Kim, S., Kang, M., Park, S., Choi, Y., and Han, S. Incoherent Bidirectional Fiber–Optic Code Division Multiple Access Networks IEEE Photonics Tech. Letters, vol 12, No 7, pp 921–923, Jul. 2000.*

* cited by examiner

Primary Examiner—John D. Lee
Assistant Examiner—Sarah U Song
(74) Attorney, Agent, or Firm—Venable; Robert Frank; Jeffri A. Kaminski

(57) ABSTRACT

An optical CDMA encoder-decoder is constructed by combining arrayed-waveguide gratings, matrix optical switches, and delay lines, otherwise by combining arrayed-waveguide grating and variable delay lines, thus providing an encoding process that a wavelength change with respect to time in optical pulses. The light includes a wide spectrum band width inserted into a CDMA encoder/decoder and is demultiplexed by arrayed-waveguide gratings. Each wave length according to the demultiplexed spectrum component spreads out in the time region based on delay time differences produced by delay lines having differential optical lengths. Thus, in CDMA, the dependency of wavelengths on delay time can be set arbitrarily.

23 Claims, 21 Drawing Sheets

CDMA ENCODER-DECODER, CDMA COMMUNICATION SYSTEM, WDM-CDMA COMMUNICATION SYSTEM

This application is based on Patent Application No. 2000-1046 filed on Jan. 6, 2000 in Japan, the content of which is incorporated hereinto by reference.

BACKGROUND OF THE INVENTION

1. Field of the Invention

The present invention relates to an encoder-decoder, and a CDMA (Code Division Multiple Access) communication system, especially, relates to a CDMA encoder-decoder and a CDMA communication system in an optical area wherein encoding and decoding of a signal can be carried out.

Also, this invention relates to a WDM (Wavelength Division Multiplexing)-CDMA communication system in an optical area wherein a CDMA technique is applied to a WDM communication.

2. Description of the Related Art

In an optical CDMA system, it is systematically possible to realize random access and self routing operation by encoding and decoding signals without using a component such as an optical switch. Therefore, this system can be applicable to an optical LAN and an optical switching system.

In the conventional art, such a configuration as shown in FIG. 20 has been used for an optical CDMA system.

In FIG. 20, optical pulse sources $1a$–$1c$ and a plurality of lattice-form optical circuits $2a$–$2f$ are opposed via a star coupler 3. Each lattice-form optical circuit includes cascaded as many as J (J: natural number) asymmetrical Mach-Zehnder interferometers in series where optical path length differences are $\Delta L, 2^1 \Delta L \ldots, 2^{J-1}\Delta L$ (J=2 in FIG. 20). Each lattice-form optical circuit positioned at the left and right side of the star coupler corresponds to an encoder and a decoder, respectively.

When the coupling coefficients of the directional couplers $4a$–$4f$ in the lattice-form optical circuits $2b$ and $2e$ are set at 0.5, and a short optical pulse with a repetition frequency of $f(Hz)\{f \leq c/(2^J n\Delta L), f=1/Tc$, c: light speed in a vacuum, n: refractive index of a waveguide, Tc: pulse interval$\}$ and a pulse width of Tp enters the lattice-form optical circuit $2b$, as many as $2^J$ optical pulse trains {interval $Tr(=n\Delta L/c)$} are newly produced in a time frame of $Tc(=1/f)$, thus code series are constructed.

These code series include phase information produced at refractive index control parts (phase shifters) $5a$ and $5b$ in the waveguide of the lattice-form optical circuit $2b$. When this encoded optical pulse train enters the lattice-form optical circuit $2e$, each optical pulse is separated into as many as $2^J$ optical pulses and then electric field components of the pulses are coherently summed up.

When the settings of phase shifters $5c$ and $5d$ in the lattice-form optical circuit $2e$ satisfy the decoding conditions in contrast to phase shifters $5a$ and $5b$, the optical power is concentrated in the center of each pulse to be decoded. However, when the settings do not satisfy the decoding conditions, an inputted encoded pulse is further spread in the time region and is not decoded.

FIGS. 21A to 21D shows the inputted pulse train (shown in FIG. 21A), the produced code series (shown in FIG. 2B) that have passed the encoder in the case of J=2, and outputs depending on the setting conditions of the decoder (FIG. 21C: when the decoding conditions are satisfied, FIG. 21D: when the decoding conditions are not satisfied). For simplicity, the effects produced by a single pulse in the inputted optical pulse train are shown.

FIG. 21B shows an example when the phases of the phase shifters in FIG. 20 are set that $\phi a=\phi b=\pi$, FIG. 21C is an example when $\phi c=\phi d=0$, and FIG. 21D is an example when $\phi c=\pi$ and $\phi d=0$. Note that $\phi a$, $\phi b$, $\phi c$, and $\phi d$ are phase shift values of the phase shifters $5a$, $5b$, $5c$, and $5d$, respectively.

Conventional Problem

The conventional method described above, however, has a problem that side lobe components are produced around the decoded optical pulse, and the S/N ratio (Signal to Noise ratio) at the receiver is deteriorated even when the decoding condition is satisfied.

In addition, in the case of non-decoding, unnecessary optical pulses are further produced to deteriorate the S/N ratio of the signal. Namely, it indicates that both an auto-correlation and cross-correlation characteristics as an encoder and a decoder for the CDMA differ from the ideal condition.

Further, an encoded pattern can be decoded easily, thus causing a problem on the secrecy of communication that is one of the merits in the CDMA.

This is because the encoder is constructed so that every pulse having a same frequency component is multiplexed in the time region, and then the maximum value of multiplexing is limited and a spread factor (bit interval(Tc)/chip interval(Tr)) cannot be increased.

When an interval and a width of an optical pulse from an optical pulse source are denoted as Tc and Tp, respectively, the maximum spread factor is given as [Tc/Tp] ([R] provides an integer that does not exceed R, R: a real number). For example, this maximum rate is eight when Tc=25 psec and Tp=3 psec. As a result, the number of patterns, that encodes phases of a pulse to zero or $\pi$, is limited to $2^8(=256)$.

SUMMARY OF THE INVENTION

An object of the present invention is to provide a CDMA encoder-decoder and a CDMA communication system that can reduce the output levels of an unnecessary side lobe component of a decoded optical signal pulse and a non-decoded optical signal pulse by increasing the number of encoding patterns, that is; that can improve both an auto-correction and cross-correlation characteristics, and the secrecy of communication.

Another object of the invention is to provide a WDM-CDMA communication system that can decrease a wavelength channel interval in a WDM communication to improve the efficiency of frequency utilization by applying a CDMA encoding-decoding technique to the WDM communication.

The above and other objects, features and advantages of the present invention will become more apparent from the following description of embodiments thereof taken in conjunction with the accompanying drawings.

DETAILED DESCRIPTION OF THE PREFERRED EMBODIMENTS

Referring now to FIGS. 1 to 19, embodiments of the present invention will be described below.

FIRST EXAMPLE

A first embodiment of the present invention will be described below by referring to FIGS. 1 to 5.

In this example, an optical CDMA encoder-decoder is constructed by connecting a first arrayed-waveguide grating, a first matrix optical switch, delay lines, a second matrix optical switch, and a second arrayed-waveguide grating in this order.

The specific configuration is explained below for detailed explanation.

Figure 1:
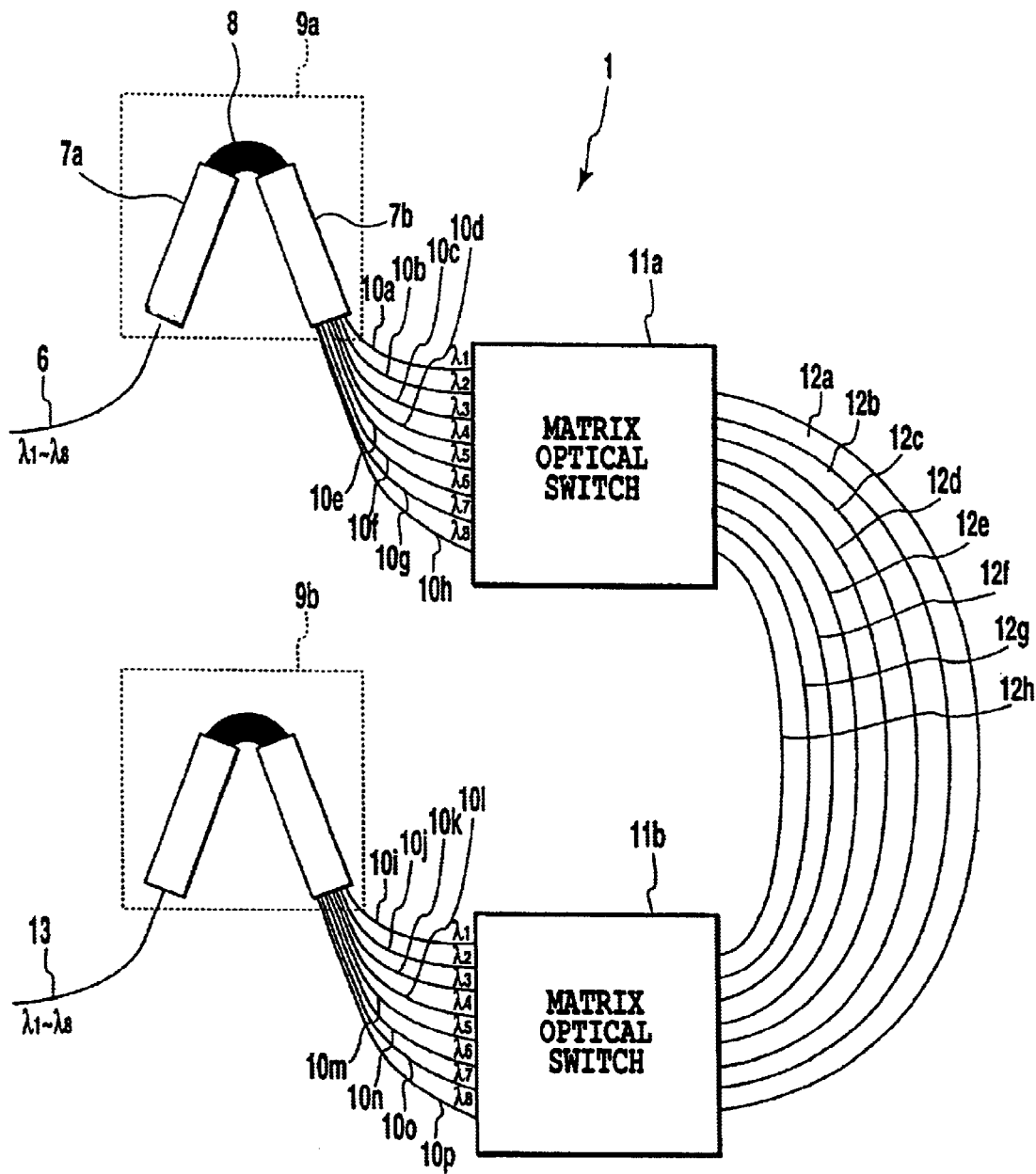
FIG. 1 is a block diagram showing the configuration of an optical CDMA encoder-decoder according to a first embodiment of the present invention.

FIG. 1 shows the configuration example of the optical CDMA encoder-decoder according to the present invention. An encoder and a decoder can be formed on separate substrates using the configuration shown in FIG. 1.

In FIG. 1, the optical CDMA encoder-decoder 1 comprises an input part 6, slab waveguides 7a and 7b, arrayed-waveguides 8, arrayed-waveguide gratings 9a and 9b comprised of these slab waveguides and arrayed-waveguides, waveguides 10a–10p, matrix optical switches 11a and 11b, delay lines 12a–12h, and an output part 13.

The arrayed-waveguide gratings 9a and 9b have functions of a wavelength demultiplexer and multiplexer, respectively. In parts where the waveguides are connected in parallel, the optical path lengths are set so that the lengths are equal each other except the delay lines 12a–12h.

Light Source

When a device shown in FIG. 1 is used as an encoder, a variety of light sources having a wide spectrum bandwidth can be used, that are inserted into the input part 6. For example, a light emission diode (LED), a super luminescent diode (SLD), an amplified spontaneous emission (ASE) light source constructed by an optical fiber amplifier or a semiconductor laser amplifier, a supercontinuum (SC) light source, and a short pulse laser such as a semiconductor or an optical fiber mode-locked laser may be used.

Light having a wide bandwidth emitted from these light sources is modulated with data by an optical intensity modulator and then the light is inserted into the input part 6.

Matrix Optical Switch

Example-1

Figure 2:
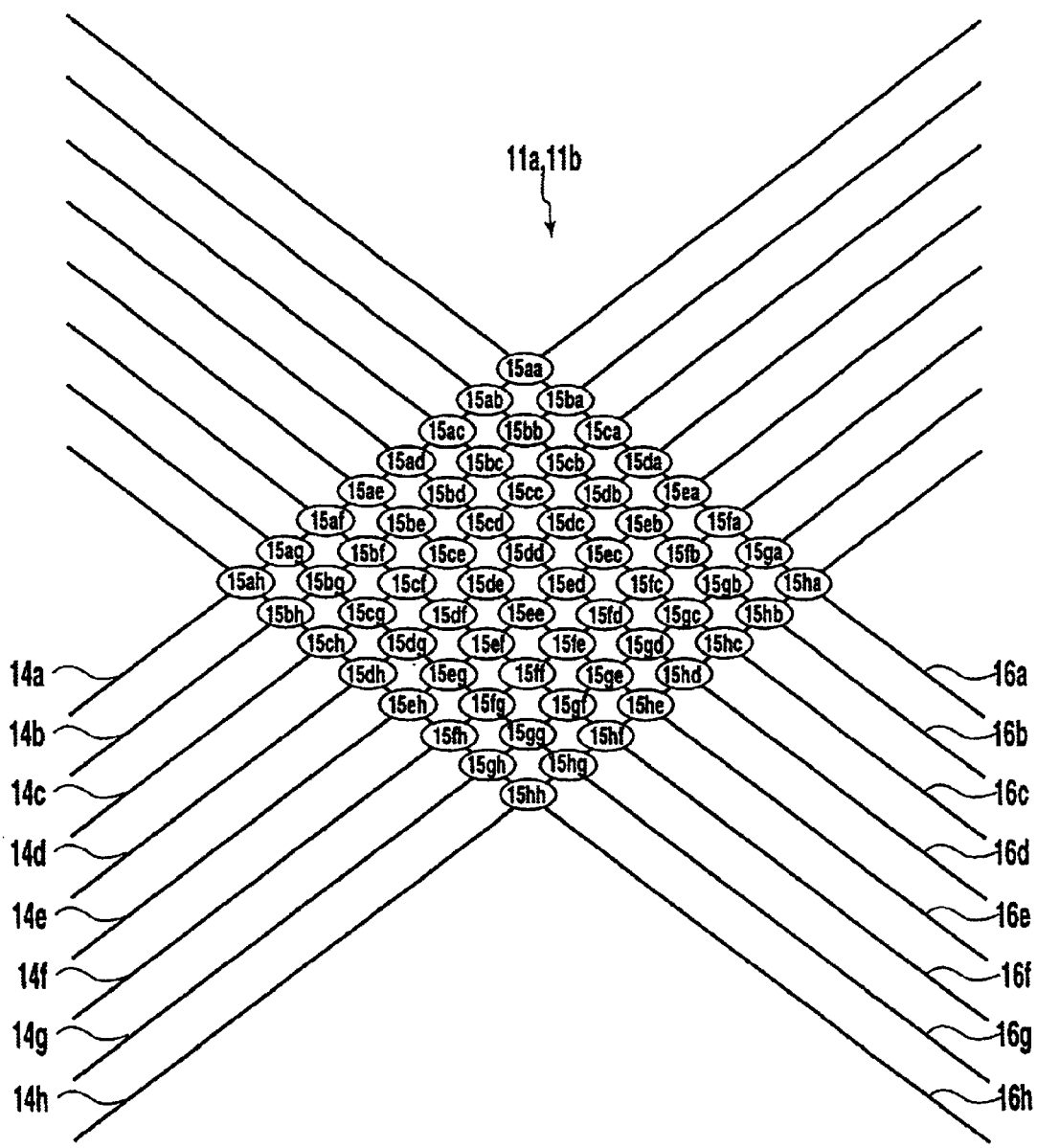
FIG. 2 is an illustrative diagram showing a configuration example of matrix optical switches in FIG. 1.

FIG. 2 shows an example of the matrix optical switches 11a and 11b constructed using an 8-input and 8-output (8×8) completely non-blocking configuration, assuming that eight frequency components are used.

Designated 14a–14h, 15aa–15hh, and 16a–16h are the input parts, 2×2 optical switches, and the output parts, respectively.

Matrix Optical Switch

Example-2

Figure 3:
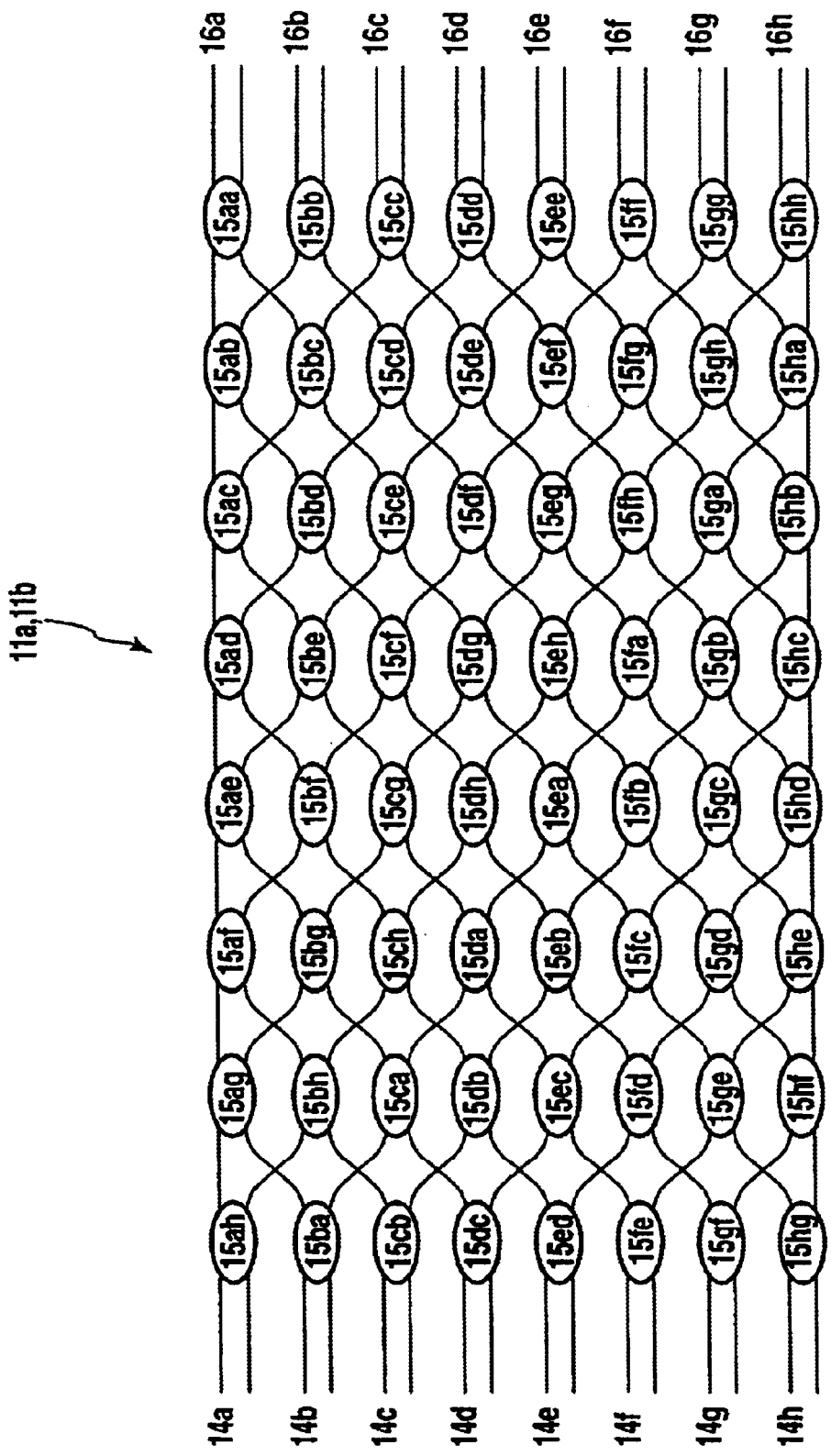
FIG. 3 is an illustrative diagram showing another configuration example of the matrix optical switches in FIG. 1.

FIG. 3 shows another example of the matrix optical switches 11a and 11b constructed using an 8×8 completely non-blocking configuration.

The configuration shown in FIG. 2 may cause loss fluctuation since the number of 2×2 optical switches 15 for connecting route differs depending on the selection of input and output ports.

Namely, in the configuration of FIG. 2, in the case of switching when 14a and 16h are connected, the light passes the optical switches 15 eight times if the connection route is selected as 14a→15ah→15bh→15ch→15dh→15eh→15fh→15gh→15hh→16h.

Also, in the configuration of FIG. 2, in the case of switching when 14a and 16a are connected, the light passes the optical switches 15 fifteen times if the connection route is selected as 14a→15ah→15ag→15af→15ae→15ad→15ac→15ab→15aa→15ba→15ca→15da→15ea→15fa→15ga→15ha→16h.

As described above, in the configuration of FIG. 2, the number of optical switches 15 differs depending on selected connection route.

In contrast, in the configuration of FIG. 3, the number of optical switches is always eight, regardless of the selected connection route. Therefore, the configuration of FIG. 3 has an advantage of providing an equal loss in all selected connection routes between the input and output ports.

Figure 4:
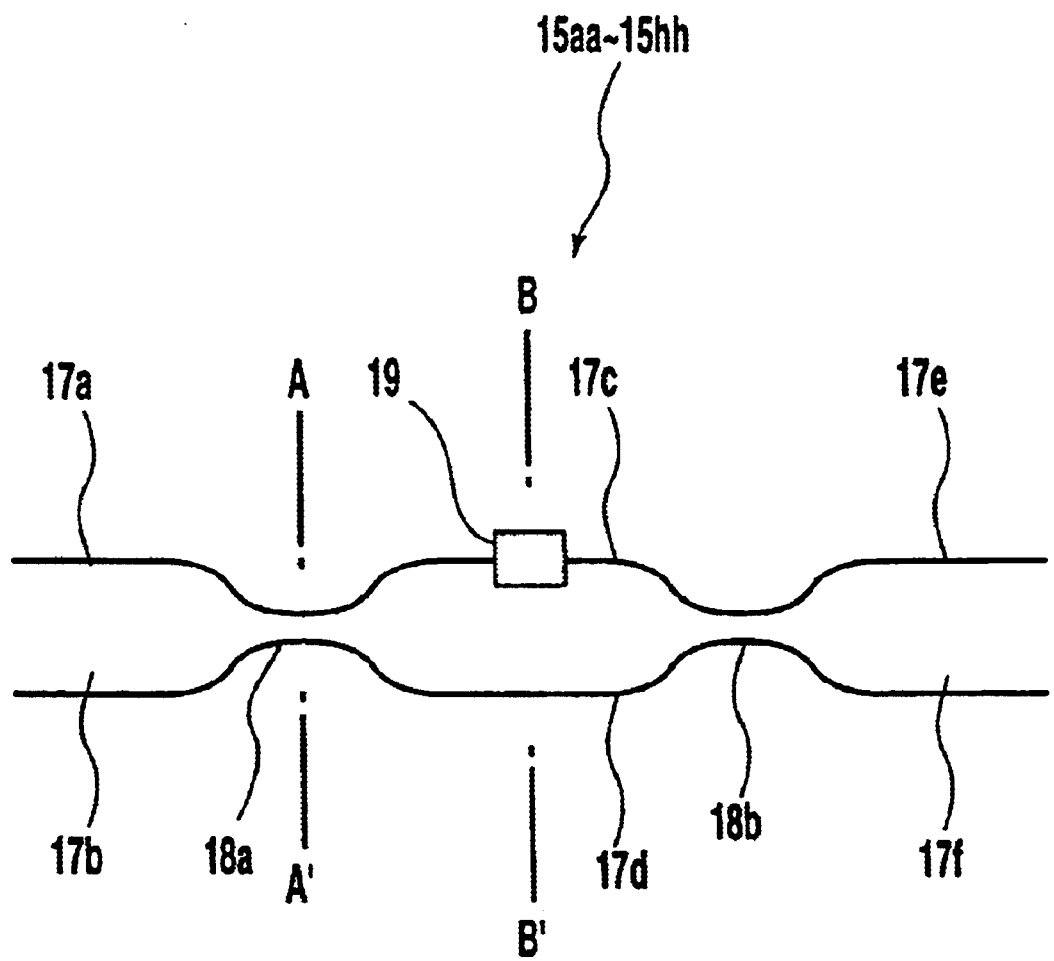
FIG. 4 is an illustrative diagram showing the configuration example of 2×2 optical switches in FIGS. 2 and 3.

FIG. 4 shows the configuration example of the 2×2 optical switches 15aa–15hh.

This switch comprises waveguides 17a–17f, directional couplers 18a and 18b, and a refractive index control part 19 of a waveguide.

Figure 5A:
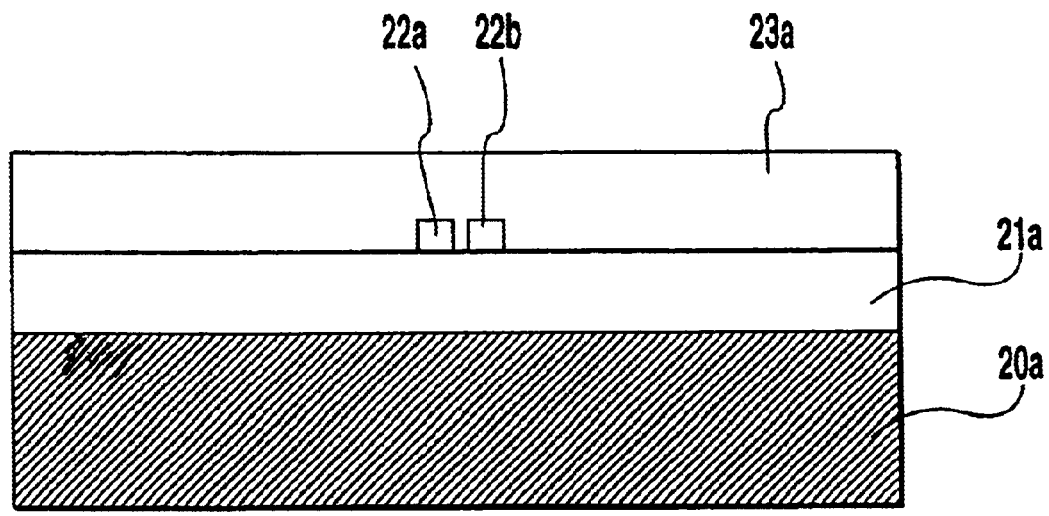
FIGS. 5A and 5B are cross-section showing the configuration of waveguides in FIG. 4.
Figure 5B:
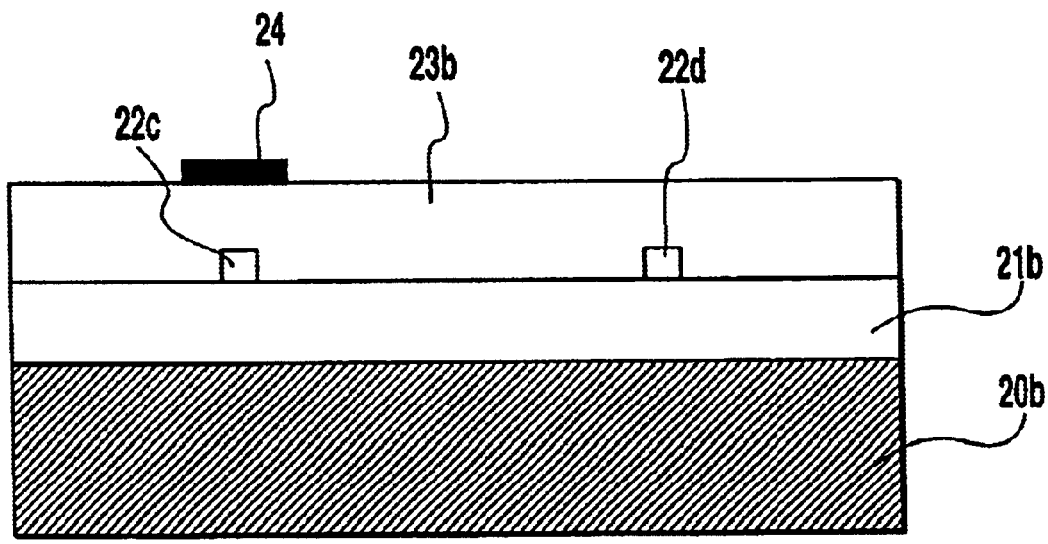

FIGS. 5A and B describe the cross-sections A–A' and B–B' in FIG. 4, respectively, viewed from the waveguides 17a and 17b in the direction of 17e and 17f.

The optical CDMA encoder-decoder 1 in this example and the other examples described later is composed of a silica glass waveguide.

First, $SiO_2$ under cladding layers 21a and 21b are deposited on Si substrates 20a and 20b by using the flame hydrolysis deposition. Next, the core layer comprised of $GeO_2$-doped $SiO_2$ glass is deposited and the two layers are consolidated using an electric furnace. Then, the core layer is etched and cores 22a–22d are formed using an predetermined waveguide pattern. Finally, $SiO_2$ over cladding layers 23a and 23b are deposited and are consolidated using an electric furnace again. Furthermore, a thin-film heater 24 [used for the control of the refractive index (phase) of the waveguide based on the thermo-optic effect] and metal interconnection are evaporated on the predetermined over cladding layer.

In FIG. 4, a symmetrical Mach-Zehnder interferometer is formed when the lengths of the directional couplers 18a and 18b, where two waveguides are arranged close to each other by several $\mu$m, are adjusted so as to provide a coupling coefficient of 0.5 and the lengths of the waveguides 17c and 17d are made equal.

Then, when the phase in the refractive index control part of waveguide 19 is set at zero, the switching of $17a \rightarrow 17f$ and $17b \rightarrow 17e$ is carried out. On the contrary, when the phase in the index control part of waveguide 19 is set at $\pi$, the switching of $17a \rightarrow 17e$ and $17b \rightarrow 17f$ is carried out.

The other configuration examples of the directional coupler may be a single symmetrical Mach-Zehnder interferometer, cascaded symmetrical Mach-Zehnder interferometers in series, a multi-mode interference coupler (MMI), etc.

As described above, when the light having a wide spectrum bandwidth emitted from a light source is inserted into the encoder or decoder, each spectrum component demultiplexed by the arrayed-waveguide grating is encoded in the time region by adding a delay time difference depending on the wavelength, which is based on the combination of the matrix optical switch and delay lines having different optical lengths. It is possible to set the combination of delay time and wavelengths arbitrarily.

SECOND EXAMPLE

Figure 6:
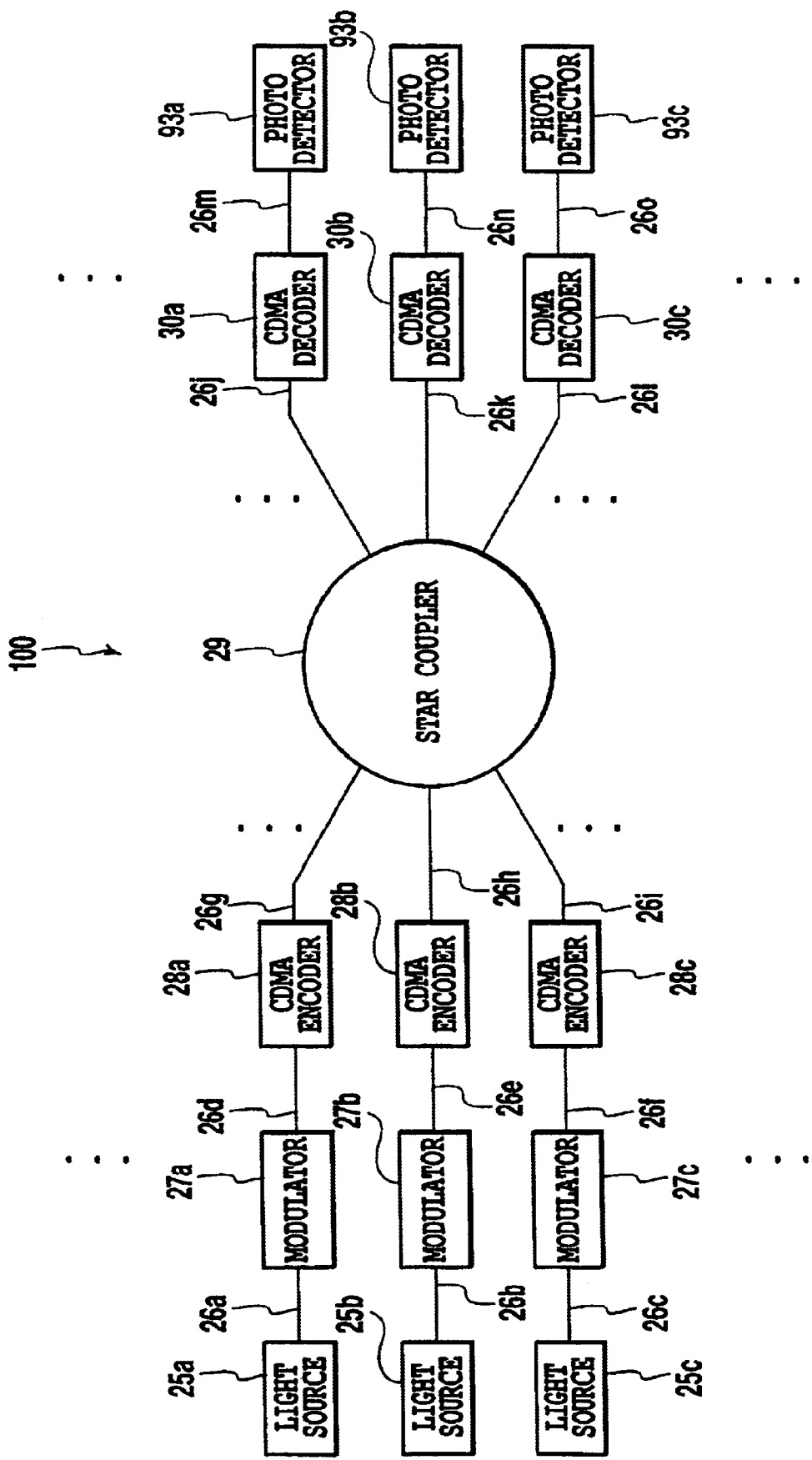
FIG. 6 is a block diagram showing the configuration of an optical CDMA communication system according to a second embodiment of the present invention.

A second embodiment of the present invention is explained by referring to FIGS. 6 and 7. Explanation of the same components and numerals as those described in FIG. 1 is omitted.

In this example, an optical CDMA communication system 100 is constructed by arbitrarily combining optical CDMA encoders and decoders that have been described above or will be referred later, and connecting an optical multiplexer and demultiplexer, and an optical transmission line between these encoders and decoders.

The second embodiment is explained below by referring to specific examples.

FIG. 6 shows the configuration example of the optical CDMA communication system 100 according to the present invention.

This system is the optical CDMA communication system that is constructed by arbitrarily combining the optical CDMA encoders and decoders in FIG. 1 and in other examples described later.

Reference numerals 25a–25c are light sources with wide spectrum bandwidth. Reference numerals 26a–26o are waveguides. Reference numerals 27a–27c are optical intensity modulators. Reference numerals 28a–28c are optical CDMA encoders. A reference numeral 29 is a star coupler. Reference numerals 30a–30c are optical CDMA decoders. Reference numerals 93a–93c are photo detectors.

Reference numerals 26g–26l include optical transmission lines normally comprised of optical fibers.

The operation of the optical CDMA encoders and decoders 1, and the optical CDMA communication system 100 having these encoders and decoders are explained below.

The following explanation assumes that the light emitted from the light source having a wide spectrum bandwidth is modulated with data by the optical intensity modulator and then the light is inserted into the input part 6 in FIG. 1.

Further, it is assumed that, for simplicity, the light sources with wide spectrum bandwidth 25a–25c have the same center wavelengths and spectrum characteristics. The light emitted from one light source with wide spectrum bandwidth may be divided into three to provide three light sources.

The light modulated with data by optical intensity modulators 27a–27c are encoded by the optical CDMA encoders using different codes. Coding is carried out when assigning the wavelength components $\lambda_1$-$\lambda_8$ demultiplexed by the arrayed-waveguide grating 9a in FIG. 1 to different delay lines by using the matrix optical switch 11a.

It is assumed that the interval and width of the modulated optical signals that have passed the optical intensity modulators 28a–28c are T and Tm(Tm$\leq$T/8), respectively, and that the delay lines 12a–12h are arranged to be shorter by Lm(Lm=cTm/n) than the neighbor in this order.

The optical CDMA encoder 28a at the transmitter has relation between wavelengths and delay lines of $(\lambda_1, \lambda_2, \lambda_3, \lambda_4, \lambda_5, \lambda_6, \lambda_7, \lambda_8) \Leftrightarrow (12d, 12f, 12c, 12g, 12h, 12b, 12a, 12e)$ is given, and the optical CDMA encoder 28b has relation between wavelengths and delay lines of $(\lambda_1, \lambda_2, \lambda_3, \lambda_4, \lambda_5, \lambda_6, \lambda_7, \lambda_8) \Leftrightarrow (12h, 12d, 12e, 12c, 12b, 12g, 12a, 12f)$.

These wavelength components $\lambda_1$-$\lambda_8$ are inserted into the predetermined waveguides 10i–10p through the matrix switch 11b and are multiplexed by the arrayed-waveguide grating 9b, and further are sent to the star coupler 29 through an output part 13.

The optical CDMA decoder 30c at the receiver carries out a decoding process that matches with the coding given by the optical CDMA encoder 28a, namely, $(\lambda_1, \lambda_2, \lambda_3, \lambda_4, \lambda_5, \lambda_6, \lambda_7, \lambda_8) \Leftrightarrow (12e, 12c, 12f, 12b, 12a, 12g, 12h, 12d)$, so as to compensate for the delay time dependence on each wavelength given at 28a.

Figure 7A:
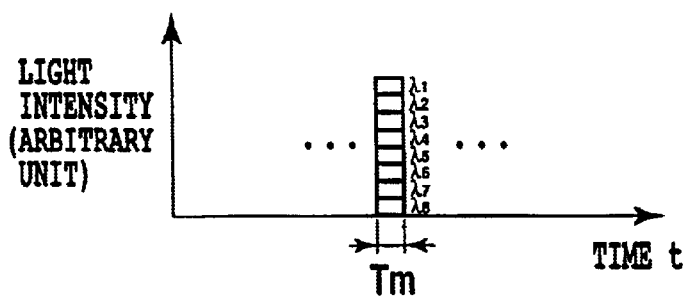
FIGS. 7A to 7E are illustrative diagram showing the input and output optical pulse train when the optical CDMA communication system shown in FIG. 6 is used.
Figure 7B:
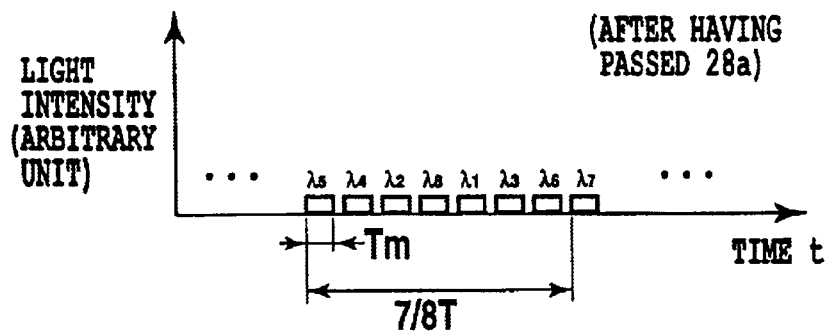
Figure 7C:
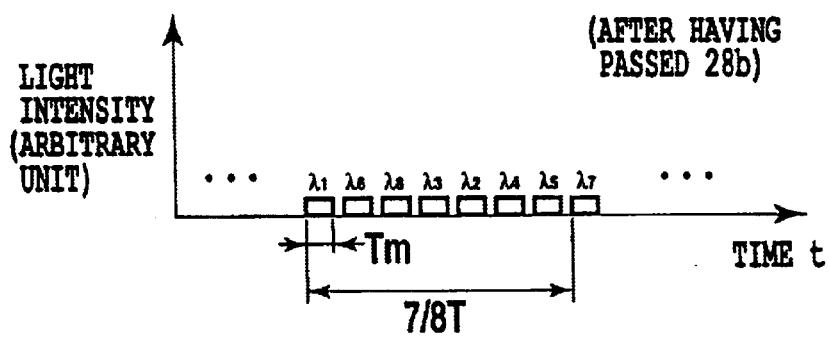
Figure 7D:
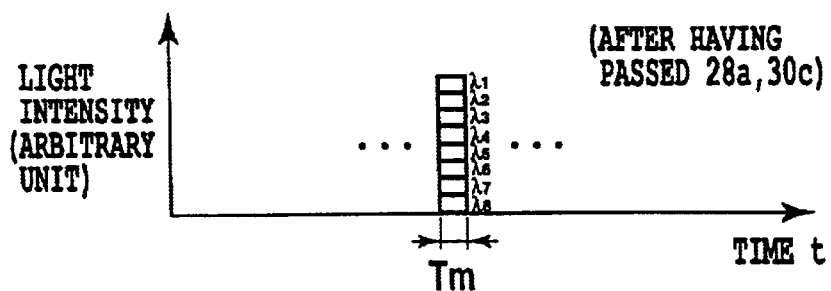
Figure 7E:
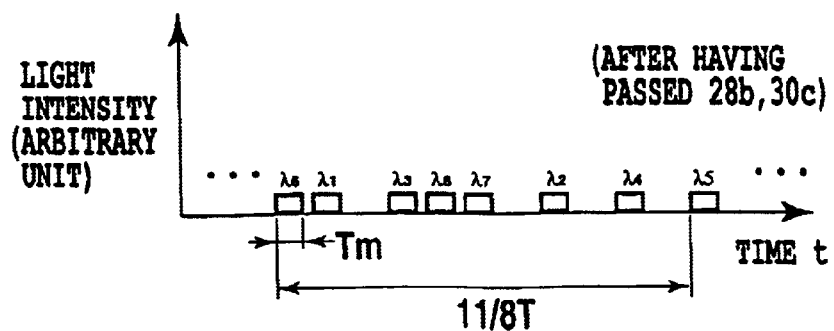

FIG. 7A shows the optical pulses that have passed the optical intensity modulators 27a and 27b, FIGS. 7B and 7C show those that have passed the optical CDMA encoders 28a and 28b, and FIGS. 7D and 7E show those that have passed the optical CDMA decoder 30c. For simplicity, the behavior of single pulse in an optical pulse train is demonstrated.

FIGS. 7A to 7E indicate that the optical pulses sent from 28*a* are decoded, but optical pluses from 28*b* are further spread at 30*c* in FIG. 6. This is because that each pulse spread caused by the delay time difference dependence on wavelength is compensated for by code matching, but the delay time difference is further expanded by the code non-matching.

The decoded optical pulses are inserted into the photo detectors 93*a*–93*c* for data receiving.

In the optical CDMA encoder-decoder in FIG. 1 and other examples described later, assuming that the number of employed wavelength components is I (I: natural number corresponding to the port number of used arrayed-waveguide gratings and matrix optical switches), coding patterns of as many as I! (when a realistic number of I=8 is given, I!=40320.) can be attained.

Since the communication system mentioned above can provide arbitrary combination of delay time and wavelengths, an optical CDMA system can be obtained where the wavelength components of an optical signal arbitrarily change with respect to time. Then it becomes possible to increase the number of coding patterns and then to improve the performance in the optical CDMA communication system.

THIRD EXAMPLE

Then a third embodiment of the present invention is described below by referring to FIG. 8. Explanation of the same components and numerals as those described above is omitted.

In this example, an optical CDMA encoder-decoder is constructed by connecting an arrayed-waveguide grating, a first matrix optical switch, delay lines, and a second matrix optical switch in this order, where the output parts of the second matrix optical switch and either the input or output parts of the arrayed-waveguide grating are connected.

Specific examples are described below for detailed explanation.

Figure 8:
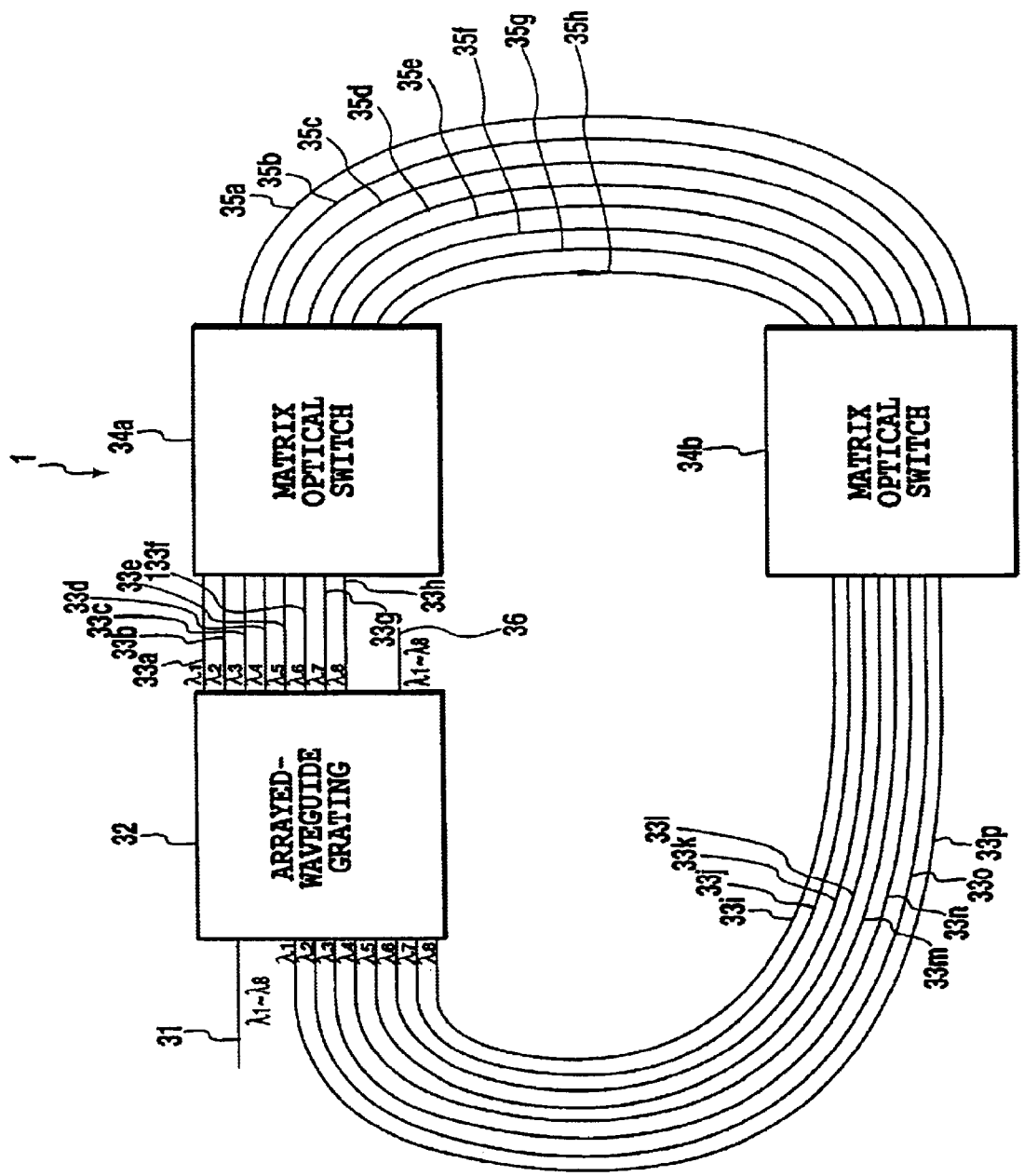
FIG. 8 is an illustrative diagram showing the configuration of an optical CDMA encoder-decoder according to a third embodiment of the present invention.

FIG. 8 shows the configuration example of the optical CDMA encoder-decoder 1. The CDMA encoder and the CDMA decoder are formed on separate substrates using the configuration shown in FIG. 8.

In FIG. 8, the optical CDMA encoder-decoder 1 comprises an input part 31, arrayed-waveguide grating 32, waveguides 33*a*–33*p*, matrix optical switches 34*a* and 34*b*, delay lines 35*a*–35*h*, and an output part 36.

The waveguides 33*i*–33*p* are connected to the unused input ports of the arrayed-waveguide grating 32, and one of the unused output ports in 32 is used as the output.

In the parts where the waveguides are connected in parallel, the optical path lengths are made equal except the delay lines 35*a*–35*h*.

The number of arrayed-waveguide gratings can be reduced to one in the configuration of FIG. 8, because the lights at the waveguides 33*i*–33*p* are concentrated to the output part 36 by utilizing the wavelength characteristics of the arrayed-waveguide grating. The operation as an optical CDMA encoder-decoder is the same as that of the second embodiment described above.

The operation is the same when the waveguides 33*i*–33*p* are connected to the unused output ports of the arrayed-waveguide grating 32, and one of the unused input ports in 32 is used as the output part.

Also, the operation is the same when the waveguides 33*i*–33*p* are connected to the used input ports (output ports) of the arrayed-waveguide grating 32 through directional couplers, and one of the used output ports (input ports) in 32 is used as the output through a directional coupler, although the loss is increased.

In this case, if an optical circulator replaces the directional coupler, the loss is decreased. The operation as an optical CDMA encoder-decoder is the same as that of the second embodiment described above.

FOURTH EXAMPLE

Now a fourth embodiment of the present invention is explained below by referring to FIG. 9. Explanation of the same components and numerals as those described above is omitted.

In this example, an optical CDMA encoder-decoder is constructed by connecting an arrayed-waveguide grating, a matrix optical switch, and delay lines in this order, where the unused end of each delay line is connected to either the input or output ports of the matrix optical switch, and the unused side ports of the matrix optical switch in this connection is connected to either the input or output ports of the arrayed-waveguide grating.

Specific examples are described below for detailed explanation.

Figure 9:
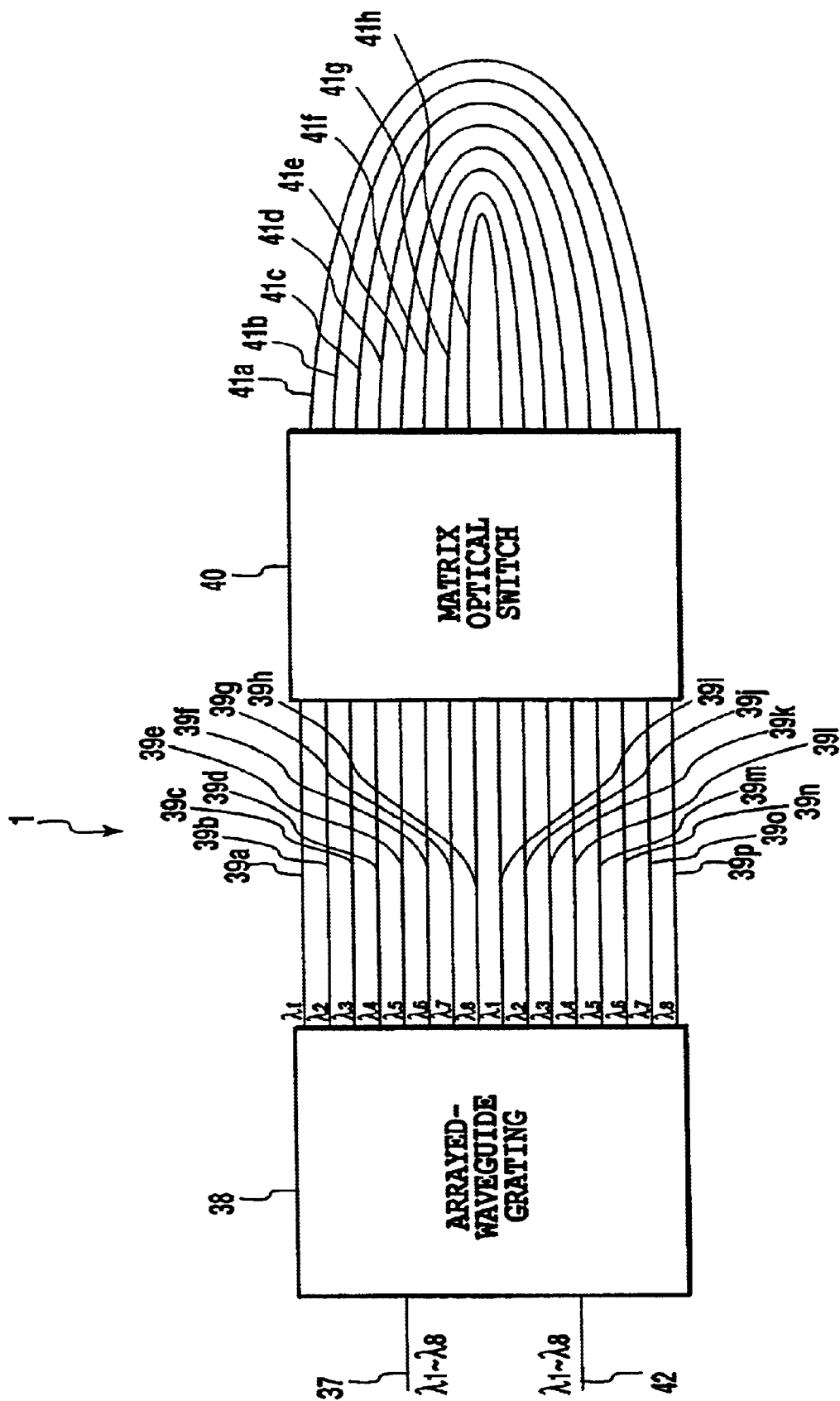
FIG. 9 is a diagram illustrating the configuration of an optical CDMA encoder-decoder according to a fourth embodiment of the present invention.

FIG. 9 shows the configuration example of the optical CDMA encoder-decoder 1. The CDMA encoder and the CDMA decoder are formed on separate substrates using the configuration shown in FIG. 9.

In FIG. 9, the optical CDMA encoder-decoder 1 comprises an input part 37, an arrayed-waveguide grating 38, waveguides 39*a*–39*p*, a matrix optical switch 40, delay lines 41*a*–41*h*, and an output part 42.

Both ends of the delay lines 41*a*–41*h* are connected to the output ports of the matrix optical switch 40.

Unused input ports of the matrix optical switch 40 are connected to unused output ports of the arrayed-waveguide grating 38 using the waveguides 39*i*–39*p*, and one of the unused input ports in 38 is used as the output part.

In the parts where the waveguides are connected in parallel, the optical path lengths are made equal except the delay lines 41*a*–41*h*.

The number of matrix optical switches and arrayed-waveguide gratings can be reduced to one in the configuration of FIG. 9, because the unused ports of the matrix optical switch are effectively utilized and the lights at the waveguides 39*i*–39*p* are concentrated to the output part 42 using the wavelength characteristics of the arrayed-waveguide grating. The operation as an optical CDMA encoder-decoder is the same as that of the second embodiment described above.

The operation is the same when the unused ends of the delay lines 41*a*–41*h* are connected to the input ports of the matrix optical switch 40, the unused output ports of 40 are connected to the unused output ports (input ports) of the arrayed-waveguide grating 38, and one of the unused input ports (output ports) in 38 is used as the output part.

Also, the operation is the same when directional couplers are set on the used ports for connection, although the loss is increased.

In this case, if an optical isolator replaces the directional coupler, the loss is decreased.

FIFTH EXAMPLE

Figure 10:
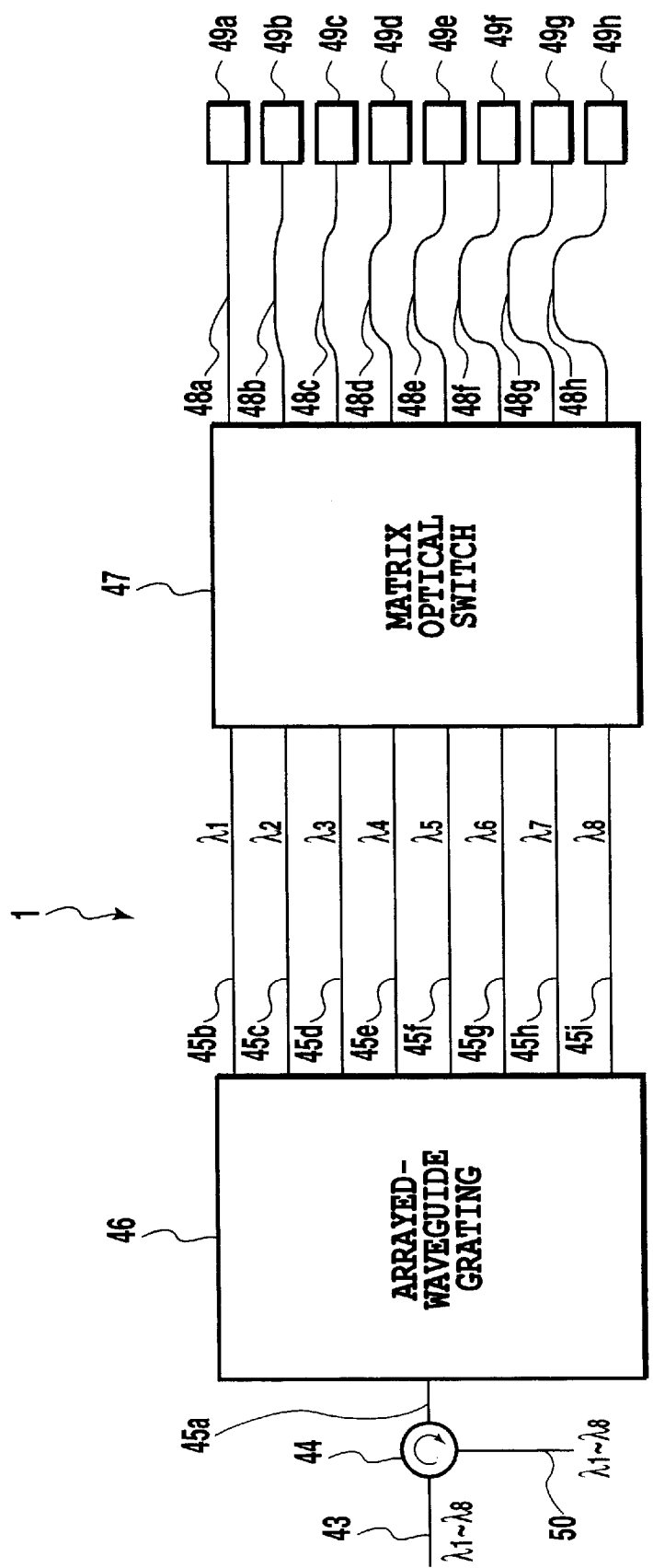
FIG. 10 is a block diagram showing the configuration of an optical CDMA encoder-decoder according to a fifth embodiment of the present invention.
Figure 11:
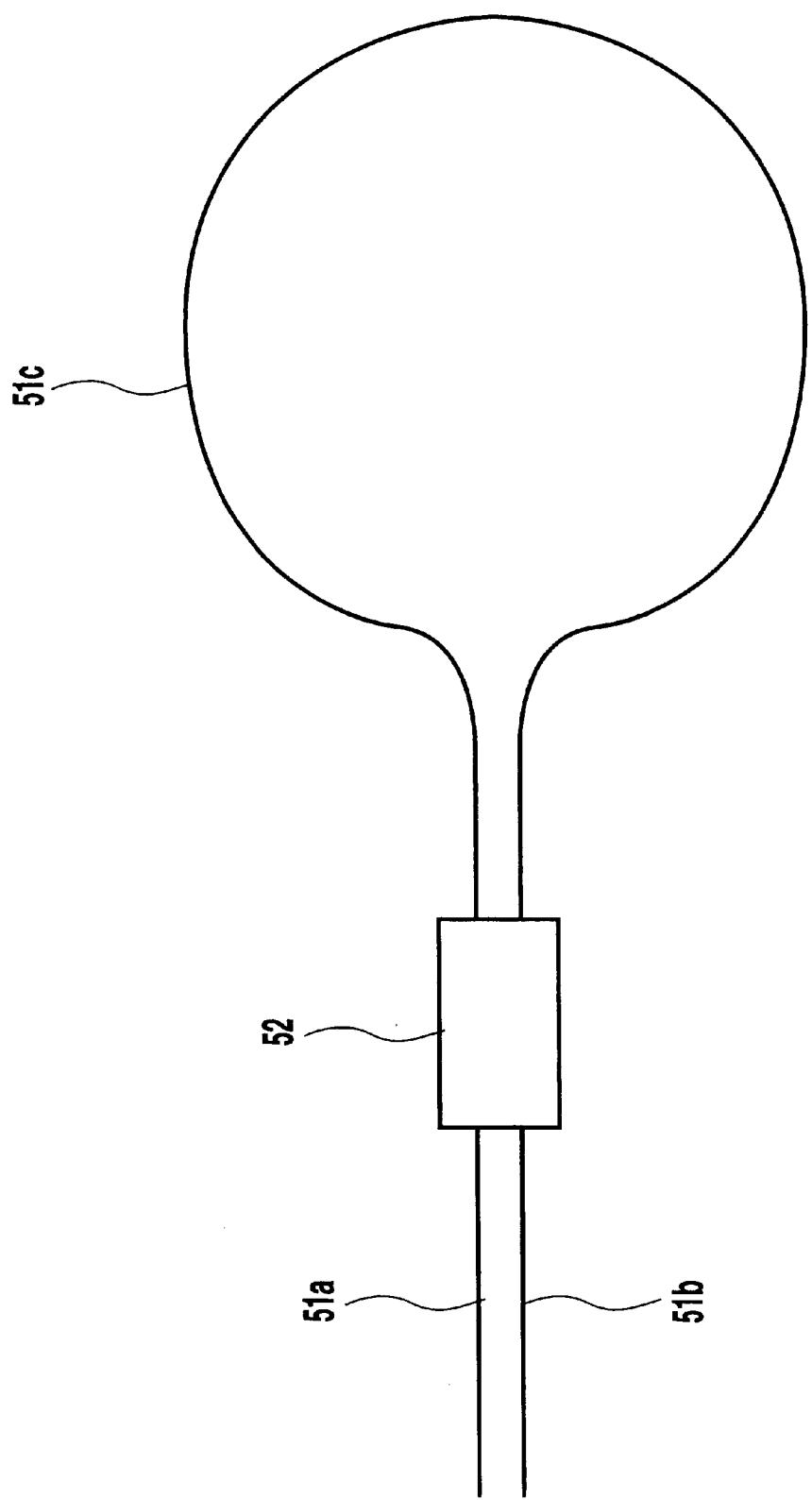
FIG. 11 is an illustrative diagram showing the configuration example of a means for reflecting light shown in FIG. 10.

Now a fifth embodiment of the present invention is explained by referring to FIGS. 10 and 11. Explanation of the same components and numerals as those described above is omitted.

In this example, an optical CDMA encoder-decoder 1 is constructed by connecting an arrayed-waveguide grating, a matrix optical switch, delay lines, and optical reflectors in this order.

Specific examples are described below for detailed explanation.

FIG. 10 shows the configuration example of the optical CDMA encoder-decoder 1. The CDMA encoder and the CDMA decoder are formed on separate substrates using the configuration shown in FIG. 10.

In FIG. 10, the optical CDMA encoder-decoder 1 comprises an input part 43, a circulator 44, waveguides 45a–45i, an arrayed-waveguide grating 46, a matrix optical switch 47, delay lines 48a–48h, optical reflectors 49a–49h, and an output part 50.

Modified Example 1

The other configuration example of the optical reflector described in FIG. 11 can be used in FIG. 10. A loop-form waveguide can be used as this optical reflector.

FIG. 11 shows the configuration example of the optical reflectors 49a–49h.

These optical reflectors 49a–49h comprise waveguides 51a–51c (51a, 51b: input or output part) and a directional coupler 52.

When the coupling coefficient of the directional coupler 52 is set at 0.5, the light inserted into 51a is divided into two lights with an intensity ratio of 1:1 that run in the clockwise (reflected at the directional coupler 52) and counter-clockwise (passing through the directional coupler 52) directions.

The phase changes of the lights that are reflected by and pass through the directional coupler 52 are zero and $\pi/2$, respectively, and the phase changes caused by the waveguide 51c are the same regardless of circulating directions. As a result, all the lights are outputted at the waveguide 51a.

Modified Example 2

It is also possible to reflect light by depositing metal films (for example, Au films) or dielectric multilayered films to the ends of the delay lines 48a–48h. Furthermore, it is also possible to reflect light by setting a bulk-type, a waveguide-type, or an optical fiber grating in 48a–48h.

In the parts where the waveguides are connected in parallel, the optical path lengths are made equal except the delay lines 48a–48h.

The light is reflected by the optical reflector 49 and the reflected light passes the same route as that of the incident light toward the opposite direction, and finally the light is outputted at the waveguide 45a. A 2×2 directional coupler can be used as output part of light. But, in this case, the part 50 is used as output using a circulator 44 to decrease the loss.

Since the light passes the delay lines 48a–48h twice, these delay lines are arranged so that the length difference from the neighbor differs by Lm/2. The operation as an optical CDMA encoder-decoder is the same as that described in the second embodiment.

SIXTH EXAMPLE

Now a sixth embodiment of the present invention is explained below by referring to FIGS. 12 to 15. Explanation of the same components and numerals as those described above is omitted.

In this example, the optical CDMA encoder-decoder is constructed by connecting a first arrayed-waveguide grating, variable delay lines, and a second arrayed-waveguide grating in this order.

Specific examples are described below for detailed explanation.

Figure 12:
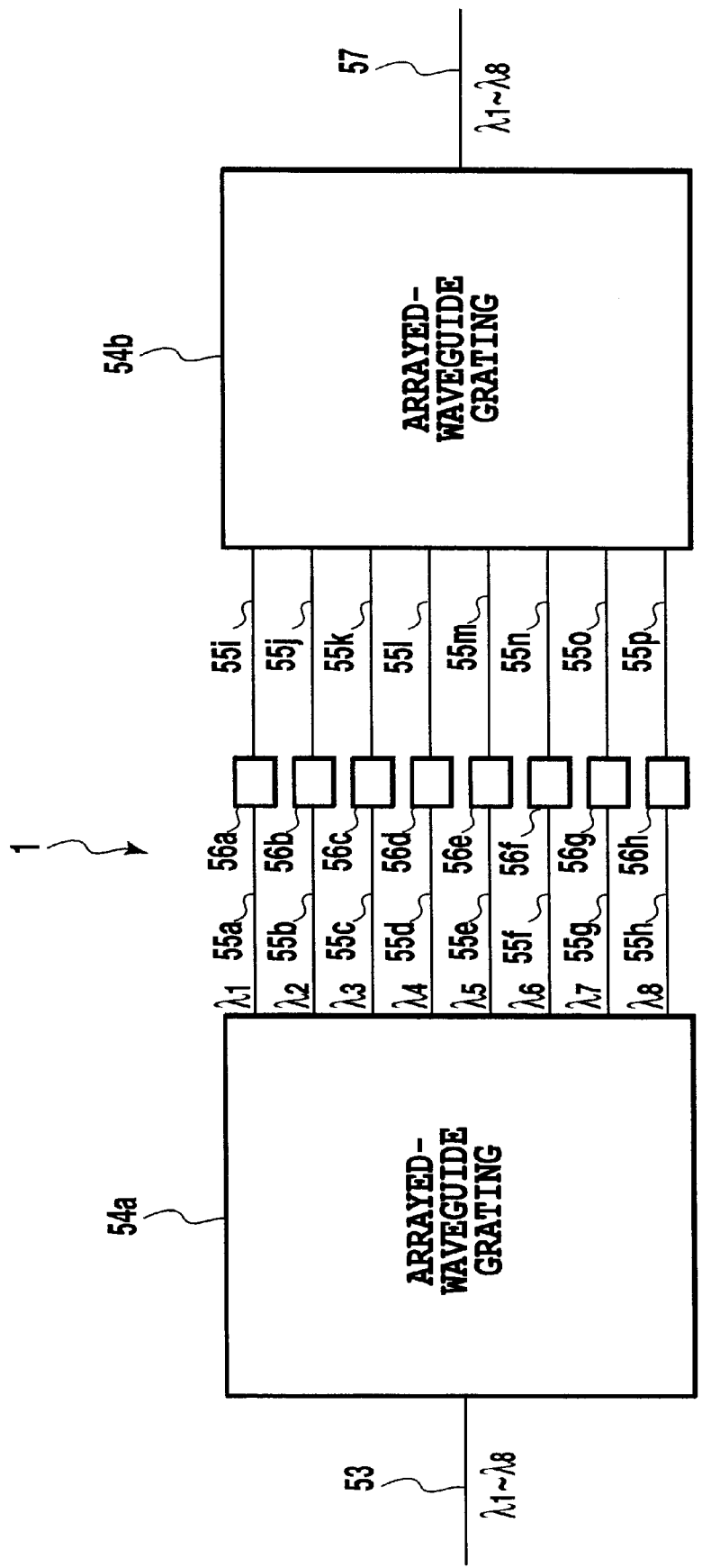
FIG. 12 is a block diagram showing the configuration of an optical CDMA encoder-decoder according to a sixth embodiment of the present invention.

FIG. 12 shows the configuration example of the optical CDMA encoder-decoder 1. The CDMA encoder and the CDMA decoder are formed on separate substrates using the configuration shown in FIG. 12.

In FIG. 12, the optical CDMA encoder-decoder 1 comprises an input part 53, arrayed-waveguide gratings 54a, 54b, waveguides 55a–55p, variable delay lines 56a–56h, and an output part 57.

Modified Example 1

Figure 13:
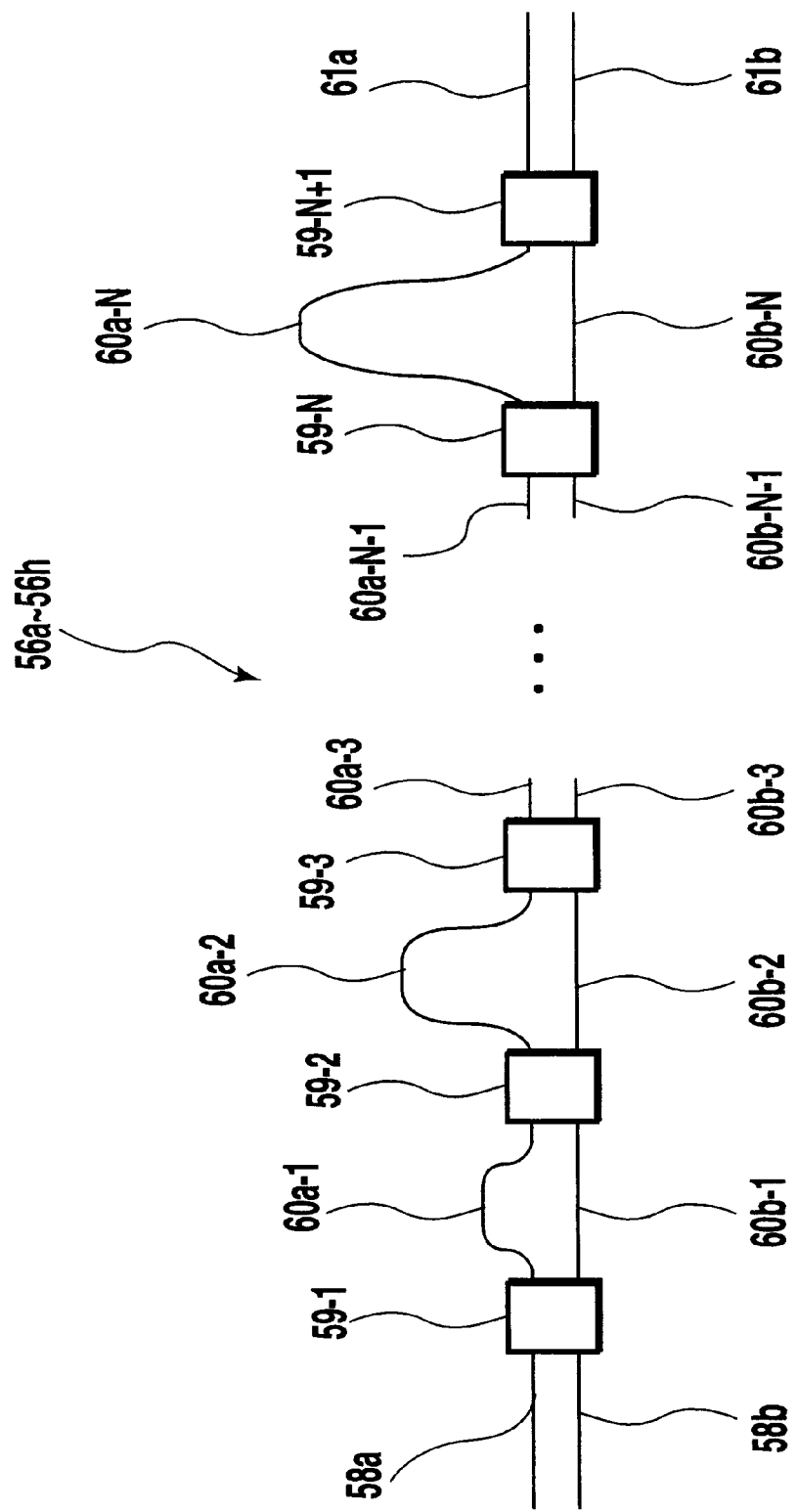
FIG. 13 is a block diagram showing the configuration example of variable delay lines shown in FIG. 12.

The other configuration example of the variable delay lines described in FIG. 13 can be used in FIG. 12. Cascaded asymmetrical Mach-Zehnder interferometers in series can be used as the variable delay lines.

FIG. 13 shows the configuration example of the variable delay lines 56a–56h.

The variable delay lines 56a–56h are constructed using input waveguides 58a and 58b, 2×2 optical switches 59-1 to 59-N+1 (N: natural number), pairs of asymmetrical arms 60a-1 to 60a-N and 60b-1 to 60b-N, and output waveguides 61a and 61b.

Either 58a or 58b is used as the input, and either 61a or 61b is used as the output. In this case, the optical path length difference $\Delta L$ of the pair of asymmetrical arms 60 is set at $\Delta L_N = 2^{N-1} c\tau_0/n$. Various optical lengths can be set when changing the switching state of the 2×2 optical switch 59, and then the variable delay lines can be realized.

The variable delay lines are arranged so that the optical path length difference becomes larger from the left to right in FIG. 13, however, the configuration is not restricted to this. These interferometers can be arranged in any order, that is; the function of variable delay lines is independent of the order of the interferometers.

The configurations can also be possible that the optical path length difference in each asymmetrical Mach-Zehnder interferometer is made equal or interferometers having various optical path length differences are arbitrarily cascaded.

An example using eight wavelength components is considered below.

Seven interferometers are necessary when all optical path length differences are made equal. However, the number of interferometers can be reduced to three when interferometers, of which optical path length differences are increased by a multiple of two, are cascaded.

In general, it is possible to construct variable delay lines in which interferometers, of which optical path length differences are increased by a multiple of an arbitrary real number, are cascaded. However, only a cascade of interferometers, where the optical path length differences are increased by a multiple of two, can provide the equal delay time difference between the neighbor's components.

Modified Example 2

Figure 14:
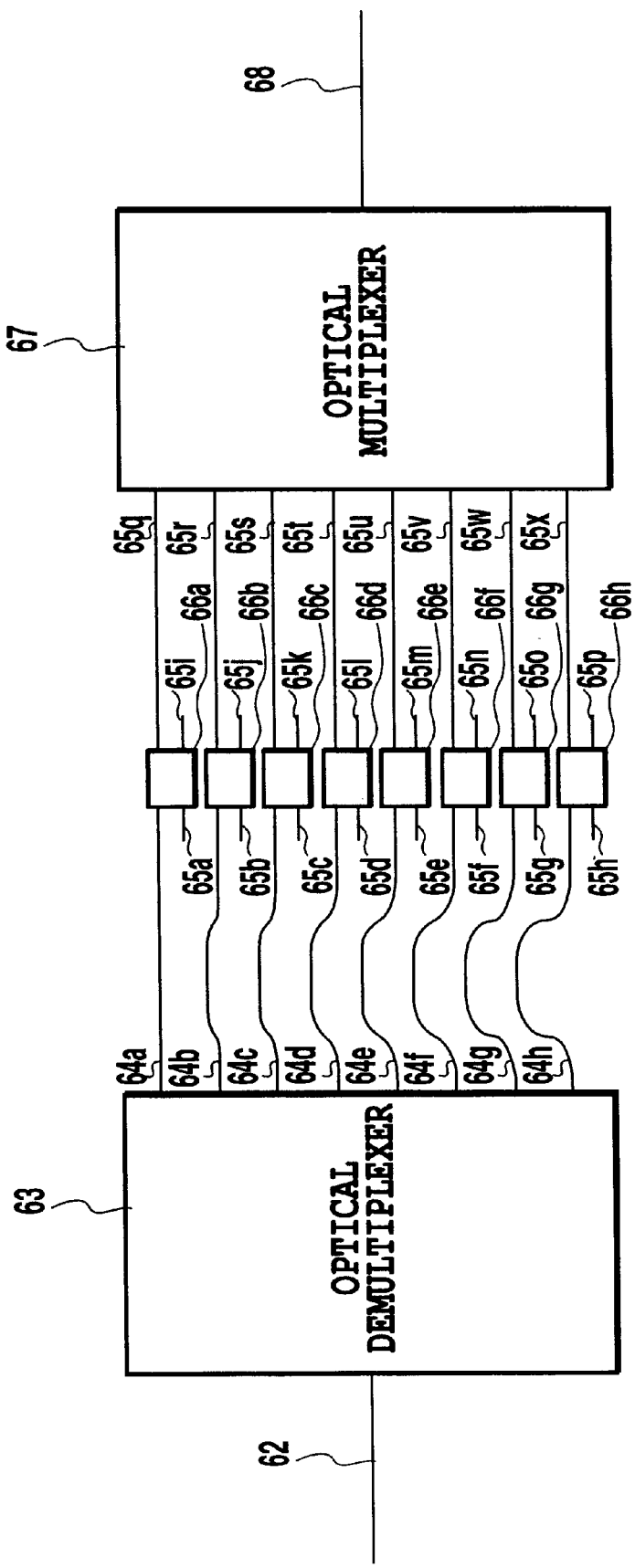
FIG. 14 is a block diagram showing the configuration example of the variable delay lines shown in FIG. 12.

The other configuration of the variable delay lines described in FIG. 14 can be used in FIG. 12. A multiplexer and a demultiplexer, that are connected by a plurality of delay lines having optical path length differences equipped with optical switches, can be used as these variable delay lines.

FIG. 14 shows other example of the configuration of the variable delay lines 56a–56h in FIG. 12.

The variable delay lines 56a–56h is constructed using an input part 62, an optical demultiplexer 63, fixed delay lines 64a–64h, waveguides 65a–65x, 2×2 optical switches 66a–66h, an optical multiplexer 67, and an output part 68.

In order to obtain the desired optical path length, only one of the lights that have passed 64a–64h is controlled so as to enter the optical multiplexer 67, by making the lengths of the fixed delay lines 64a–64h different from each other and by setting one of the 2×2 optical switches 66a–66h to the bar state.

The other lights are outputted at 65i–65p and are not outputted at the output waveguide 68, because the optical switches 66 are in the cross state.

As well known, the optical demultiplexer 63 and multiplexer 67 can take a configuration, such as a star coupler, multi-mode interferometer (MMI) coupler, cascaded 2×2 directional couplers in series, cascaded 2×2 symmetrical Mach-Zehnder interferometers in series, or cascaded Y-branch waveguides in series.

Modified Example 3

Figure 15:
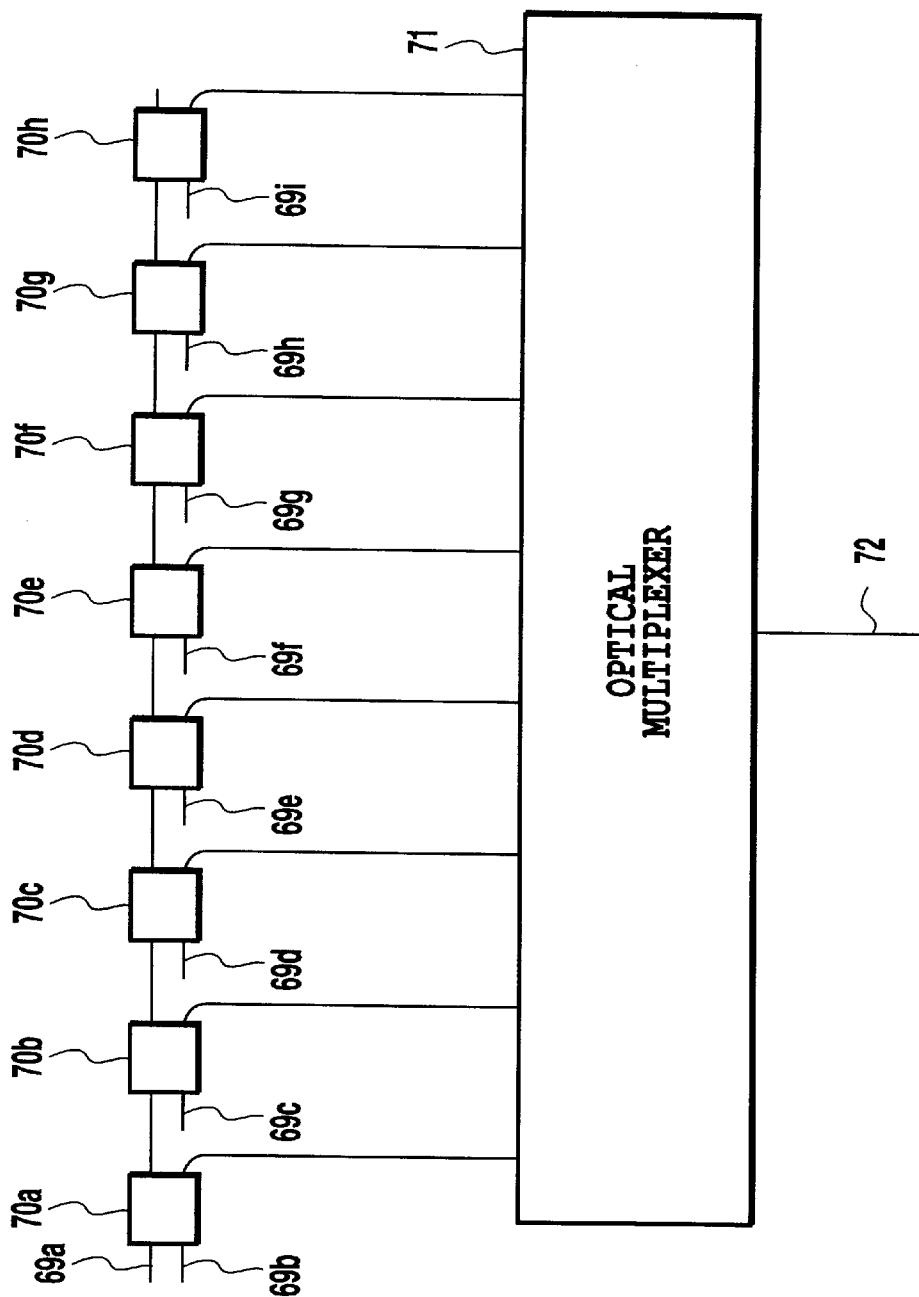
FIG. 15 is a block diagram showing the configuration example of the variable delay lines shown in FIG. 12.

Also, the other configuration example of the variable delay lines described in FIG. 15 can be used in FIG. 12. The variable delay lines is constructed so that a plurality of waveguides coupled with a waveguide at different positions are multiplexed by an optical multiplexer.

FIG. 15 shows other example of the configuration of the variable delay lines 56a–56h in FIG. 12.

The variable delay lines 56a–56h are constructed using waveguides 69a–69i (either 69a or 69b is used as the input part), 2×2 optical switches 70a–70h, an optical multiplexer 71, and an output part 72.

When light enters the waveguide 69a, only one of the 2×2 optical switches 70a–70h is set to the cross state and the light passes one of the waveguides 69b–69i so as to control the delay time for obtaining a desired optical path length, and then the light is introduced into the optical multiplexer 71. The variable delay lines can be formed in this way.

The following is the explanation of operation of the encoder in FIG. 12.

The wavelength components $\lambda_1$-$\lambda_8$ divided by the arrayed-waveguide grating 54a are inserted into the variable delay lines 56a–56h described above. By setting lengths of 56a–56h at different values, encoding is carried out in the same way as that of the second embodiment described above.

These wavelength components $\lambda_1$-$\lambda_8$ are multiplexed by the arrayed-waveguide grating 54b and are outputted at the output part 57. The outputted optical pulses have been spread in the time region by delay time difference depending on each wavelength.

The operation of the decoder of the configuration in FIG. 12 is similar to that of the second embodiment. That is; it is controlled so that the optical pulse spread caused by delay time differences depending on the wavelength is recovered when matching conditions are satisfied, but the pulse is further spread when the matching conditions are not satisfied.

In the parts where the waveguides are connected in parallel in FIG. 12, the optical path lengths are made equal except the variable delay lines 56a–56h.

SEVENTH EXAMPLE

Now a seventh embodiment of the present invention is explained below by referring to FIG. 16. Explanation of the same components and numerals as those described above is omitted.

In this example, the optical CDMA encoder-decoder is constructed by connecting an arrayed-waveguide grating and variable delay lines in this order, where the output ports of the variable delay lines are connected to either input or output ports of the arrayed-waveguide grating one by one.

Specific examples are described below for detailed explanation.

Figure 16:
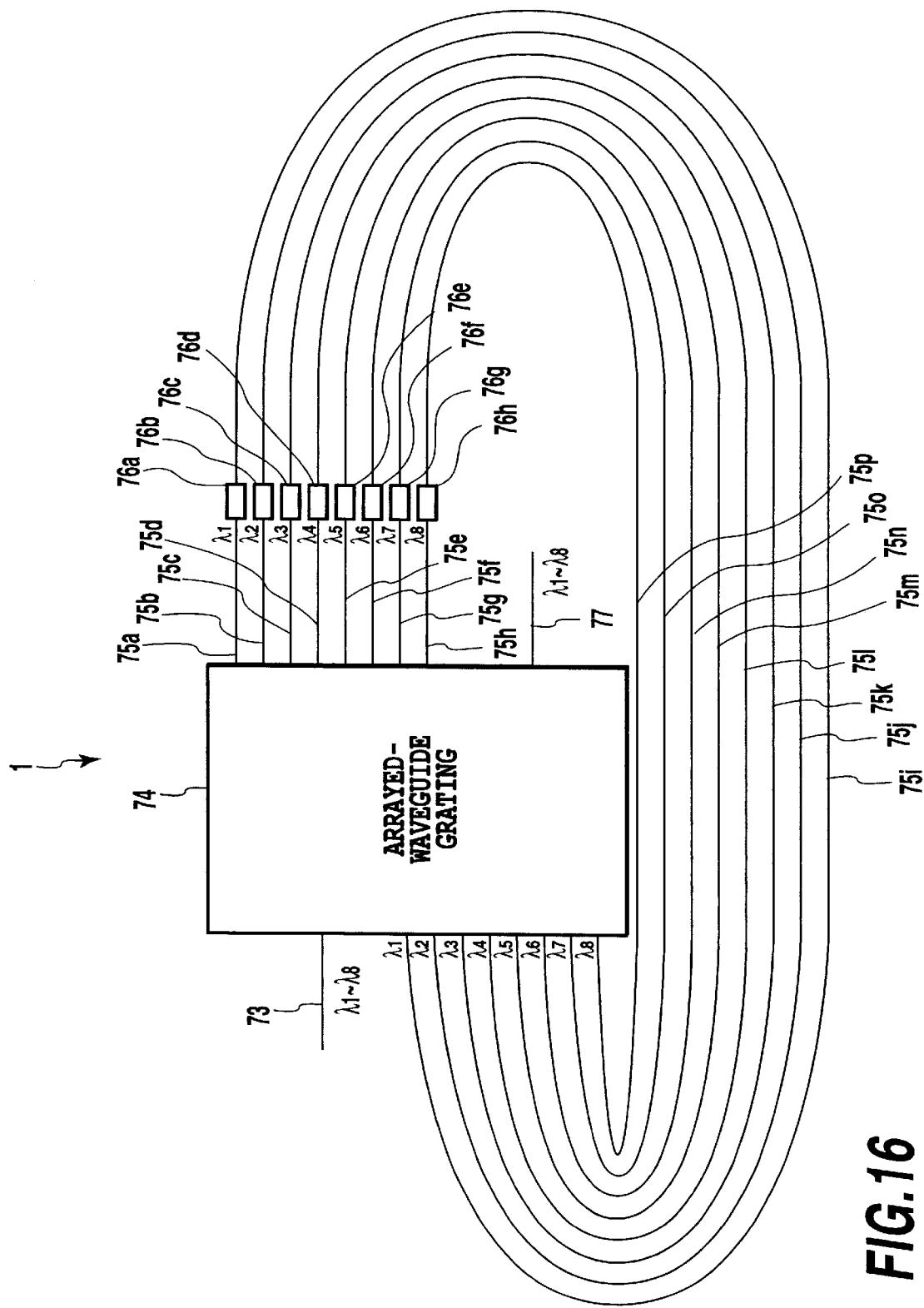
FIG. 16 is a block diagram showing the configuration of an optical CDMA encoder-decoder according to a seventh embodiment of the present invention.

FIG. 16 shows the configuration example of the optical CDMA encoder-decoder 1. The CDMA encoder and the CDMA decoder are formed on separate substrates using the configuration shown in FIG. 16.

In FIG. 16, the optical CDMA encoder-decoder 1 comprises an input part 73, an arrayed-waveguide grating 74, waveguides 75a–75p, variable delay lines 76a–76h, and an output part 77.

Ends of the delay lines 76a–76h is connected to the output ports of the arrayed-waveguide grating 74 through the waveguides 75a–75h, and the other ends are connected to the unused input ports of the arrayed-waveguide grating 74 through the waveguides 75i–75p. One of the unused output ports in the arrayed-waveguide grating 74 is used as the output. In the parts where the waveguides are connected in parallel, the optical path lengths are made equal except the variable delay lines 76a–76h.

In the configuration of FIG. 16, the number of arrayed-waveguide gratings can be reduced to one, because the unused ports of the arrayed-waveguide grating are effectively utilized using the wavelength characteristics of the arrayed-waveguide grating. The operation as an optical CDMA encoder-decoder is the same as that described in the second embodiment.

The operation is the same when the unused ends of the variable delay lines 76a–76h are connected to the unused output ports of the arrayed-waveguide grating 74 and one of the unused input ports in 74 is used as the output. Also, the operation is the same when directional couplers are set on the used ports for connection, although the loss is increased.

In this case, if an optical circulator replaces the directional coupler, the loss can be decreased.

EIGHTH EXAMPLE

Now an eighth embodiment of the present invention is explained below by referring to FIG. 17. Explanation of the same components and numerals as those described above is omitted.

In this example, the optical CDMA encoder-decoder is constructed by connecting an arrayed-waveguide grating, variable delay lines, optical reflectors in this order.

Specific examples are described below for detailed explanation.

Figure 17:
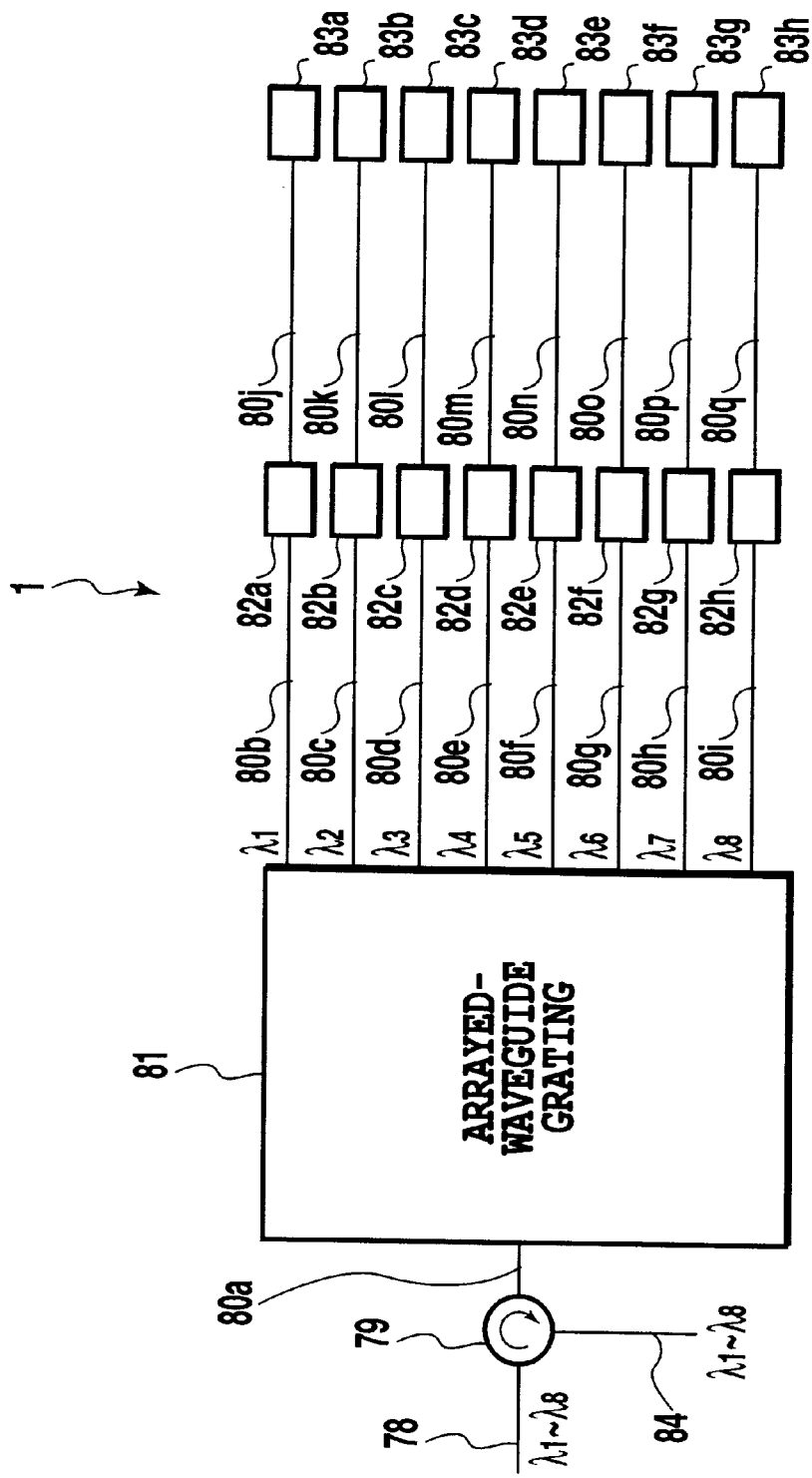
FIG. 17 is a block diagram showing the configuration of an optical CDMA encoder-decoder according to an eighth embodiment of the present invention.

FIG. 17 shows the configuration example of the optical CDMA encoder-decoder 1. The CDMA encoder and the CDMA decoder are formed on separate substrates using the configuration shown in FIG. 17.

In FIG. 17, the optical CDMA encoder-decoder 1 comprises an input part 78, a circulator 79, waveguides 80a–80q, an arrayed-waveguide grating 81, variable delay lines 82a–82h, optical reflectors 83a–83h, and an output part 84.

Light is reflected by the optical reflector 83, and the reflected light passes the same route as that of the incident light toward the opposite direction, and then is outputted at the waveguide 80a. The configuration, that the light is outputted at the output part 84 using the circulator 79, can decrease the loss, although a 2×2 directional coupler can be used for the circulator.

The means for reflecting light can be a loop-form waveguide, deposition of metal or dielectric multilayered film to the waveguide end, or a bulk-type or a waveguide-type or an optical fiber grating.

Because light passes the variable delay lines 82a–82h twice, 82a–82h are arranged so that a length difference from the neighbor differs by Lm/2. The operation as an optical CDMA encoder-decoder is the same as that described in the second embodiment.

In the parts where the waveguides are connected in parallel, the optical path lengths are made equal except the variable delay lines 82a–82h.

NINTH EXAMPLE

Now a ninth embodiment of the present invention is explained below by referring to FIGS. 18 and 19. Explanation of the same component and numerals as described above is omitted.

In this example, an optical WDM-CDMA communication system 101 is constructed so that arbitrary combination of optical CDMA encoders and decoders 1 described above is applied to optical WDM communication system, and an optical multiplexer and demultiplexer and an optical transmission line are set between the encoders and decoders.

In the following, an explanation is provided by referring to specific examples.

Figure 18:
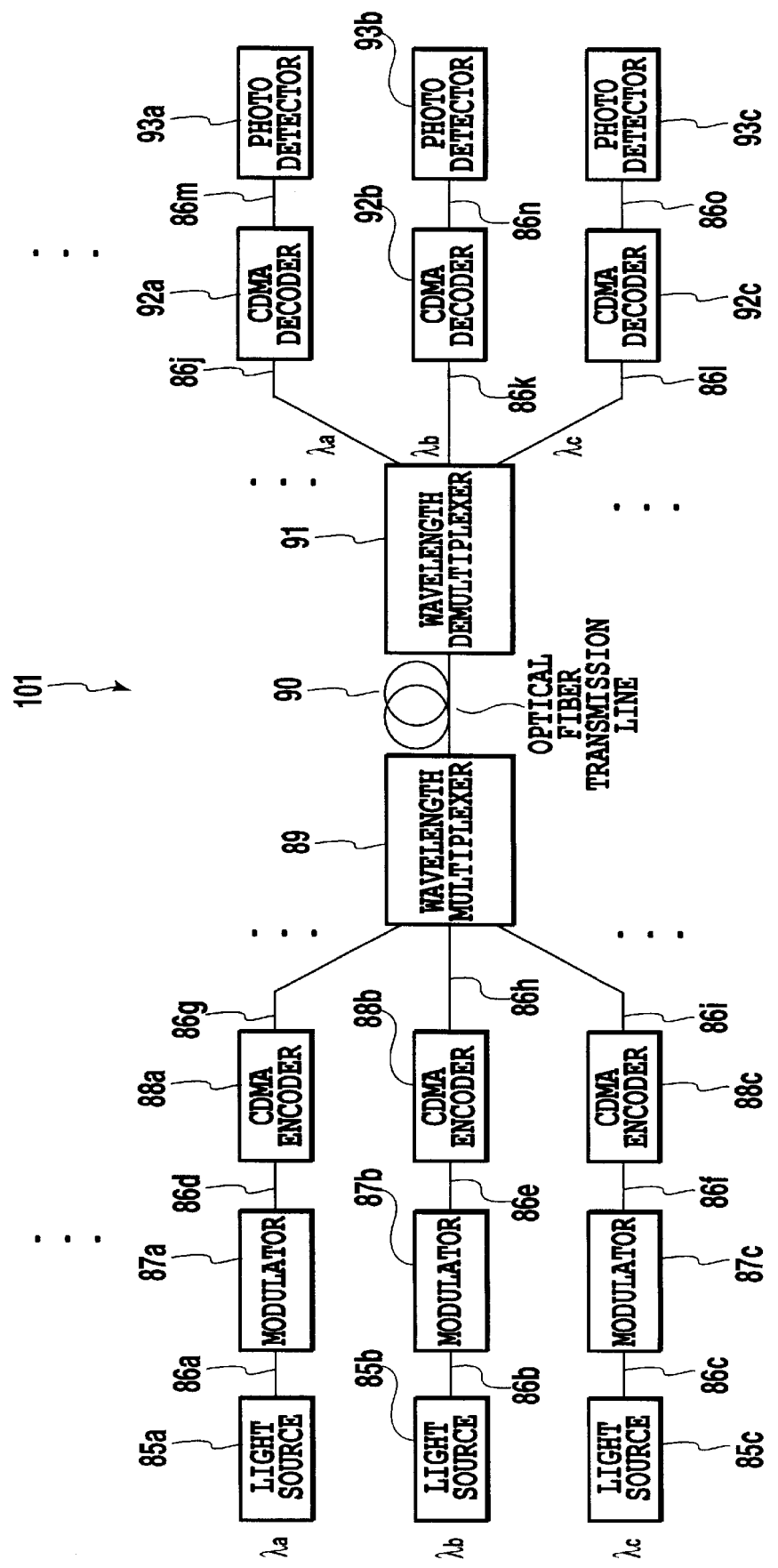
FIG. 18 is a block diagram showing the configuration of an optical WDM-CDMA communication system according to a ninth embodiment of the present invention.
Figure 19A:
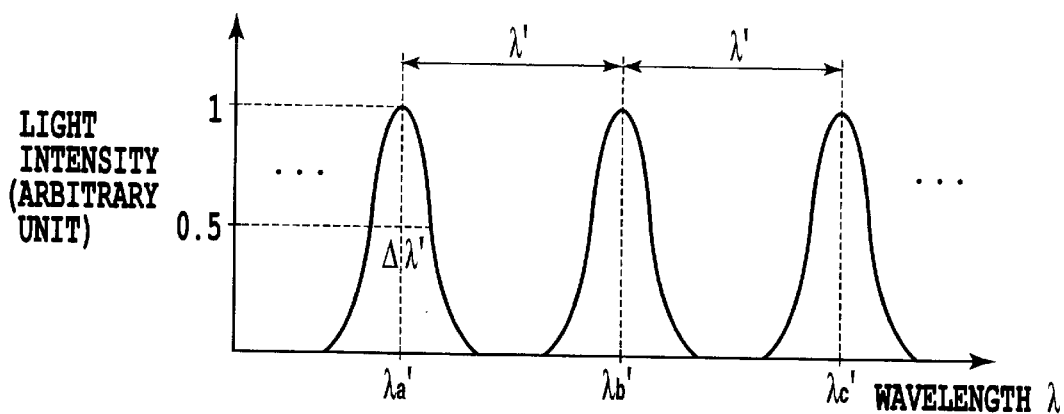
FIGS. 19A to 19C are illustrative diagrams showing the wavelength assignment in the optical WDM system and the WDM-CDMA communication system shown in FIG. 18.
Figure 19B:
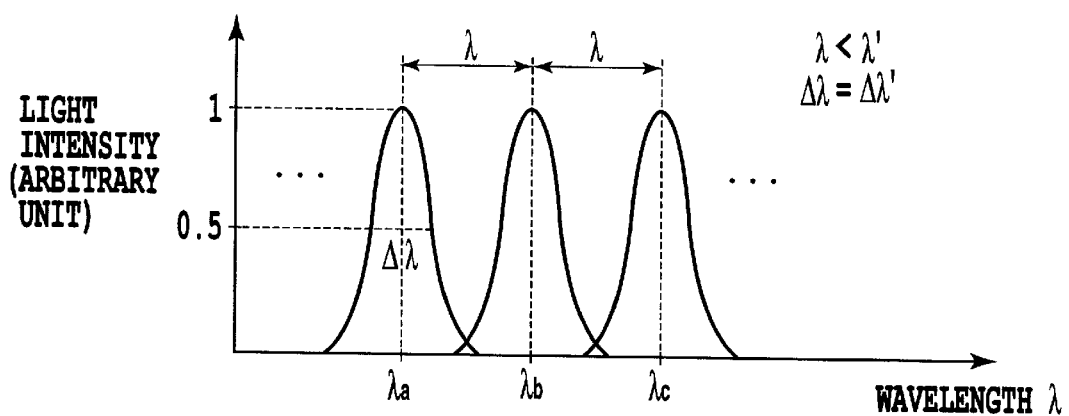

FIG. 18 shows the configuration example of the optical WDM-CDMA communication system 101 according to the present invention. FIGS. 19A and 19B show the wavelength assignment in usual WDM communication and in the optical WDM-CDMA communication system, respectively.

This system is an optical WDM-CDMA communication system in which arbitrary combination of the optical CDMA encoders and decoders described above is applied to the WDM communication system.

Reference numerals 85a–85c are light sources with different center wavelengths. Reference numerals 86a–86o are waveguides. Reference numerals 87a–87c are optical intensity modulators. Reference numerals 88a–88c are optical CDMA encoders. A reference numeral 89 is a wavelength multiplexer. A reference numeral 90 is an optical fiber transmission line. A reference numeral 91 is a wavelength demultiplexer. Reference numerals 92a–92c are optical CDMA decoders. Reference numerals 93a–93c are photo detectors.

The operations of the optical CDMA encoder-decoder 1 and the optical WDM-CDMA communication system employing the encoder-decoder 1 are explained in the following.

The lights having different wavelength channels modulated with data by the intensity modulators 87a–87c are encoded by the optical CDMA encoders 88a–88c using different codes. After these wavelengths are multiplexed by the wavelength multiplexer 89, they pass through the optical fiber transmission line 90, and are demultiplexed by the wavelength demultiplexer 91 at the receiver. Then, these wavelength channels are decoded by the optical CDMA decoders 92a–92c using codes corresponding to each wavelength.

The arrayed-waveguide grating described above can be used as the wavelength multiplexer 89 and demultiplexer 91. Besides, the Mach-Zehnder-type wavelength multiplexer and demultiplexer, where asymmetrical Mach-Zehnder interferometers are cascaded in series in the tree-form, can also be used.

In the usual WDM optical communication system, for example, each wavelength channel is assigned so that it has an interval of $\lambda'$ and a bandwidth of $\Delta\lambda'$ as shown in FIG. 19A. It is assumed that the channel interval cannot be made narrower than $\lambda'$ considering crosstalk characteristics among wavelengths in order to maintain high communication quality.

Figure 19C:
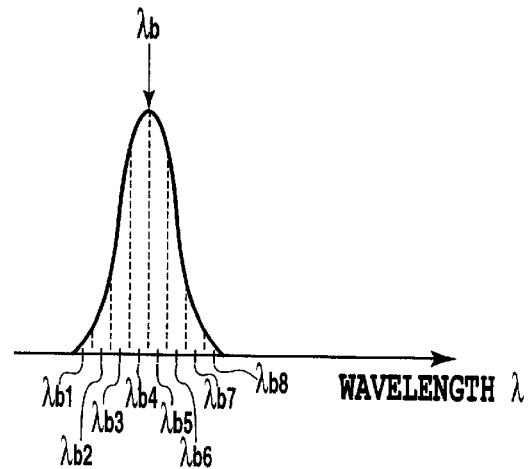
Figure 20:
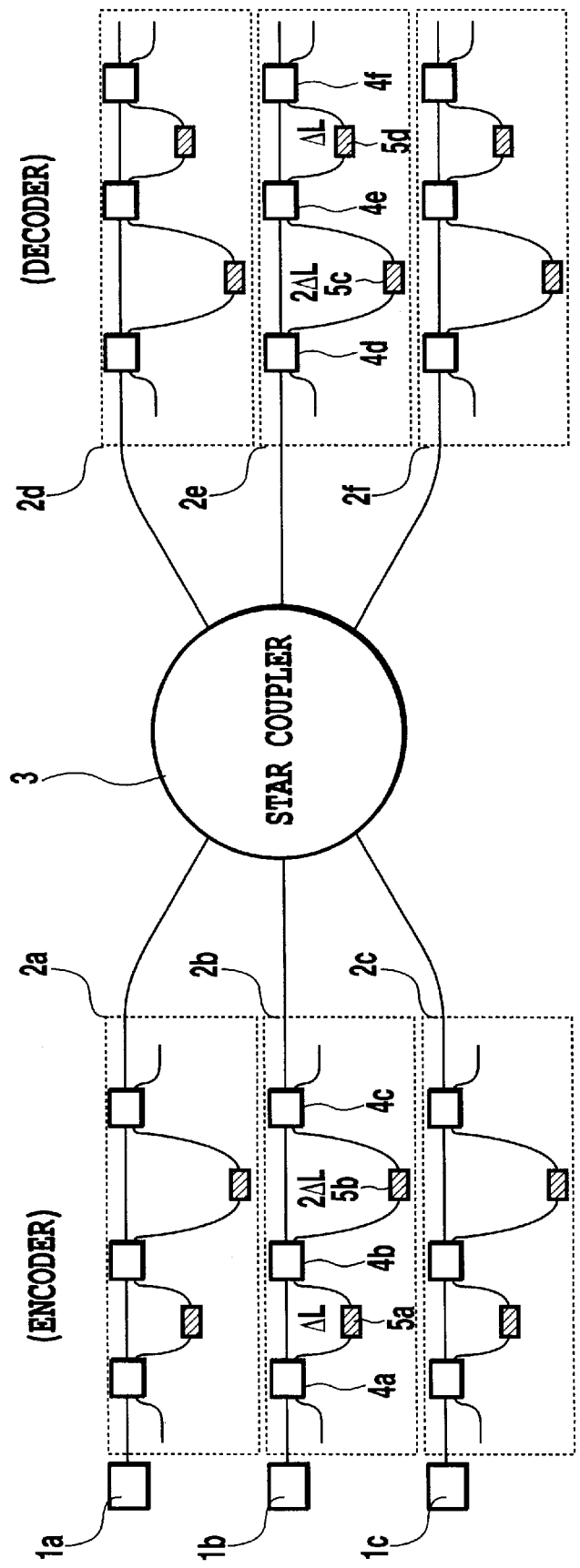
FIG. 20 is a block diagram showing a conventional optical CDMA encoder-decoder and optical CDMA communication system.
Figure 21A:
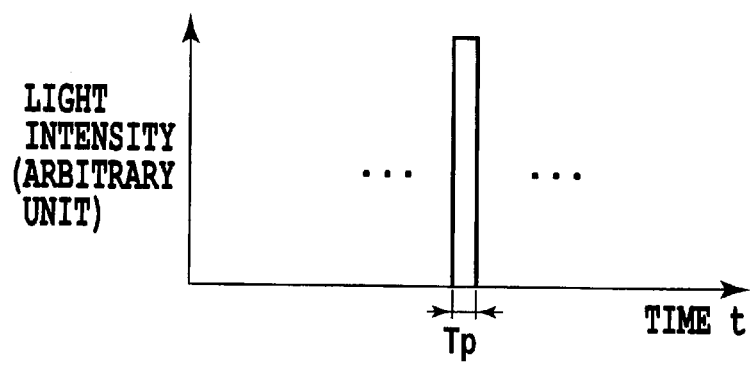
FIGS. 21A to 21D are illustrative diagrams showing the input and output optical pulse train when the optical CDMA encoder-decoder and the optical CDMA communication system shown in FIG. 20 is used.
Figure 21B:
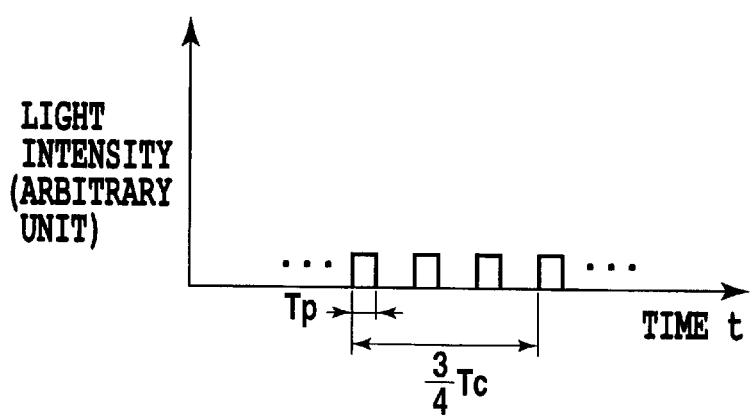
Figure 21C:
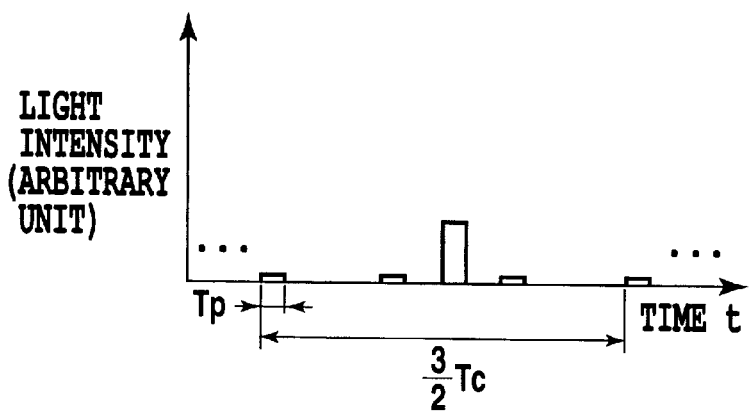
Figure 21D:
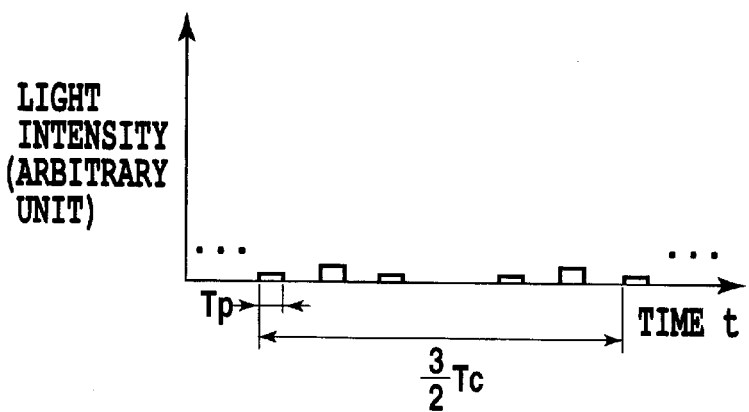

For example, as shown in FIG. 19C, each wavelength channel is divided into eight wavelength components, and these components are encoded and decoded by the optical CDMA encoder and decoder, respectively, by giving different delay time to the eight wavelength components. Each light of which center wavelength is $\lambda a$, $\lambda b$, or $\lambda c$ is encoded using each different code. When decoding is carried out using a code corresponding to the desired wavelength channel, only the light of the desired wavelength channel can be decoded, but the lights of the other wavelength channels are further encoded at the optical CDMA decoder. Therefore, the effect caused by some crosstalk is reduced at the receiver, and high-quality communications can be achieved using the narrower interval than that in the usual WDM communication.

Namely, in the optical WDM-CDMA communication system, each wavelength channel in the optical WDM transmission is encoded and decoded using a different pattern code, and then the capability to identify each wavelength channel by the code is improved. Therefore, channel assignment intervals in the optical WDM communications can be decreased, and the frequency utilization efficiency can be improved.

The waveguides of the optical CDMA encoder-decoder 1 above in the embodiments described above can be formed using, for example, a dielectric waveguide, a semiconductor waveguide, a polymer waveguide, or an optical fiber as well as a glass waveguide.

Also, a hybrid-integrated configuration having a combination of several kinds of waveguides can be used as the waveguides of the optical CDMA encoder-decoder 1.

The phase shifter controls the refractive index of waveguides. For example, the phenomenon that induces the refractive index change by the thermo-optic effect when using the polymer waveguide, the phenomenon that induces the refractive index change by the electro-optic effect when using the dielectric waveguide, and the phenomenon that induces the refractive index change equivalently by changing the fiber length using a piezo-electric element when using the optical fiber, can be utilized.

As described above, since the optical CDMA encoder-decoder is constructed by combining arrayed-waveguide gratings, matrix optical switches, and delay lines, or by combining arrayed-waveguide gratings and variable delay lines, the present invention can carry out encoding process so that a wavelength changes with respect to time in the optical pulse by setting arbitrary combination of delay time and wavelengths.

Also, in the present invention, an optical CDMA system can be realized where the wavelength components of the optical signal change with respect to time and the arbitrary combination of the delay time and wavelengths can be attained. As a result, since the number of encoding patterns can be increased, an optical CDMA communication system can be realized where the auto-correlation and cross-correlation characteristics and the secrecy of communication can be improved.

In addition, in the present invention, each wavelength channel in the optical WDM transmission is encoded and decoded with different patterns by the optical CDMA encoder-decoder, and as a result, the capability to identify each wavelength channel is improved. Therefore, an optical WDM-CDMA communication system can be realized where channel assignment intervals in the optical WDM communication can be made narrower and then the efficiency of frequency utilization can be improved.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A CDMA encoder-decoder comprising:
   a first arrayed-waveguide grating having a plurality of input and output parts, and inputting and outputting a signal;
   a first matrix optical switch having a plurality of input and output parts, the input parts being connected to the output parts of said first arrayed-waveguide grating;
   a plurality of delay lines of which ends are connected to the output parts of said first matrix optical switch and of which lengths are different from each other;
   a second matrix optical switch having a plurality of input and output parts, the input parts being connected to the other ends of said plurality of delay lines; and
   a second arrayed-waveguide grating having a plurality of input and output parts, the input parts being connected to the output parts of said second matrix optical switch, and the output parts outputting the signal.

2. A CDMA encoder-decoder comprising:
   an arrayed-waveguide grating having a plurality of input and output parts, and inputting and outputting a signal;
   a first matrix optical switch having a plurality of input and output parts, the input parts being connected to the output parts of said arrayed-waveguide grating;
   a plurality of delay lines of which ends are connected to the output parts of said first matrix optical switches and of which lengths are different from each other; and
   a second matrix optical switch having a plurality of input and output parts, the input parts being connected to the other ends of said delay lines;
   wherein the output parts of said second matrix optical switch are connected to either the input parts or output parts of said arrayed-waveguide grating.

3. A CDMA encoder-decoder comprising:
   an arrayed-waveguide grating having a plurality of input and output parts, and inputting and outputting a signal;
   a matrix optical switch having a plurality of input and output parts, the input parts being connected to the output parts of said arrayed-waveguide grating; and
   a plurality of delay lines of which ends are connected to the output parts of said matrix optical switch and of which lengths are different from each other;
   wherein the other ends of said delay lines are connected to either the input parts or output parts of said matrix optical switch; and
   the connection side parts of said matrix optical switch that have not been used for the connection to the other ends of said delay lines are connected to either the input parts or output parts of said arrayed-waveguide grating.

4. A CDMA encoder-decoder comprising:
   an arrayed-waveguide grating having a plurality of input and output parts, and inputting and outputting a signal;
   a matrix optical switch having a plurality of input and output parts, the input parts being connected to the output parts of said arrayed-waveguide grating;
   a plurality of delay lines of which ends are connected to the output parts of said matrix optical switch and of which lengths are different from each other; and
   optical reflectors connected to the other ends of said delay lines.

5. A CDMA communication system comprising:
   the CDMA encoder-decoder according to any one of claims 1 to 4,:
   encoders and decoders including a plurality of said CDMA encoders and decoders; and
   means for multiplexing and demultiplexing light and a means for transmitting light are disposed between said encoders and decoders.

6. The CDMA communication system according to claim 5, wherein said encoders and decoders comprise an arbitrary combination of a plurality of said CDMA encoders and decoders.

7. A WDM-CDMA communication system comprising:
   a WDM communication system including the CDMA encoder-decoder according to any one of the claims 1 to 4,;
   wherein a plurality of said CDMA encoders and decoders are used for encoding and decoding each of a plurality of signal wavelengths; and
   means for multiplexing and demultiplexing light and a means for transmitting light are disposed between said encoders and decoders.

8. The WDM-CDMA communication system according to claim 7, wherein said CDMA encoders and decoders comprise an arbitary combination of a plurality of said CDMA encoders and decoders.

9. A CDMA encoder-decoder comprising:
   a first arrayed-waveguide grating having a plurality of input and output parts, and inputting and outputting a signal;
   a plurality of variable delay lines of which input parts are connected to the output parts of said first arrayed-waveguide grating; and
   a second arrayed-waveguide grating having a plurality of input and output parts, the input parts being connected to the output parts of said variable delay lines;
   wherein said variable delay lines comprise one asymmetrical Mach-Zehnder interferometer or cascaded asymmetrical Mach-Zehnder interferometers in series having the same optical path length differences.

10. A CDMA encoder-decoder comprising:
    a first arrayed-waveguide grating having a plurality of input and output parts, and inputting and outputting a signal;
    a plurality of variable delay lines of which input parts are connected to the output parts of said first arrayed-waveguide grating; and
    a second arrayed-waveguide grating having a plurality of input and output parts, the input parts being connected to the output parts of said variable delay lines;
    wherein said variable delay lines comprise cascaded asymmetrical Mach-Zehnder interferometers in series and at least one of said asymmetrical Mach-Zehnder interferometers has an optical path length difference different from those of the others.

11. The CDMA encoder-decoder according to claim 10, wherein K, an integer equal to or more than two, asymmetrical Mach-Zehnder interferometers have optical path length differences which are $2^1, 2^2, \ldots,$ and $2^{K-1}$ times the minimum optical path length difference.

12. A CDMA encoder-decoder comprising:
a first arrayed-waveguide grating having a plurality of input and output parts, and inputting and outputting a signal;
a plurality of variable delay lines of which input parts are connected to the output parts of said first arrayed-wave guide grating; and
a second arrayed-waveguide grating having a plurality of input and output parts, the input parts being connected to the output parts of said variable delay lines;
wherein said variable delay lines comprise a multiplexer and a demultiplexer;
said multiplexer and demultiplexer are connected by a plurality of variable delay lines with different lengths, and
an optical switch is disclosed on each of said plurality of delay lines.

13. A CDMA encoder-decoder comprising:
a first arrayed-waveguide grating having a plurality of input and output parts, and inputting and outputting a signal;
a plurality of variable delay lines of which input parts are connected to the output parts of said first arrayed-waveguide grating; and
a second arrayed-waveguide grating having a plurality of input and output parts, the input parts being connected to the output parts of said variable delay lines;
wherein said variable delay lines comprise as many as M, an integer equal to or more than two, coupling-coefficient-variable directional couplers that connect a first single waveguide to as many as M waveguides at as many as M different positions; and
said M waveguides are merged into a second single output waveguide by an optical multiplexer after being coupled with said first single waveguide.

14. A CDMA encoder decoder comprising:
an arrayed-wave guide grating having a plurality of input and output part, and inputting and outputting a signal; and
a plurality of variable delay lines of which input parts are connected to the output parts of said arrayed-wave guide grating;
wherein the output parts of said variable delay lines are connected to either the input parts or output parts of said arrayed-waveguide grating,
wherein said variable delay lines comprise one asymmetrical Mach-Zehnder interferometer or cascaded asymmetrical Mach-Zehnder interferometers in series having the same optical path length differences.

15. A CDMA encoder-decoder comprising:
an arrayed-waveguide grating having a plurality of input and output parts, and inputting and outputting a signal; and
a plurality of variable delay lines of which input parts are connected to the output parts of said arrayed-waveguide grating;
wherein the output part of said variable delay lines are connected to either the input parts or output parts of said arrayed-waveguide grating,
wherein said variable delay lines comprise cascaded asymmetrical Mach-Zehnder interferometers in series and at least one of said asymmetrical Mach-Zehnder interferometers has an optical path length difference different from those of the others.

16. The CDMA encoder-decoder according to claim 15, wherein K, an integer equal to or more than two, asymmetrical Mach-Zehnder interferometers have optical path length differences which are $2^1, 2^2, \ldots,$ and $2^{K-1}$ times the minimum optical path length difference.

17. A CDMA encoder-decoder comprising:
an arrayed-waveguide grating having a plurality of input and output parts, and inputting and outputting a signal; and
a plurality of variable delay lines of which input parts are connected to the output parts of said arrayed-waveguide grating;
wherein the output parts of said variable delay lines are connected to either the input parts or output parts of said arrayed-waveguide grating,
wherein said variable delay lines comprise a multiplexer and a demultiplexer;
said multiplexer and demultiplexer are connected by a plurality of variable delay lines with different lengths, and
an optical switch is disposed on each of said plurality of delay lines.

18. A CDMA encoder-decoder comprising:
an arrayed-waveguide rating having a plurality of input and output parts, and inputting a signal; and
delay lines of which input parts are connected to the output parts arrayed waveguide grating;
wherein the output parts of said variable delay lines are connected to either the input parts or output parts of said arrayed-waveguide grating,
wherein said variable delay lines comprise as many as M, an integer equal to or more than two, coupling-coefficient-variable directional couplers that connect a first single waveguide to as many as M waveguides at as many as M different positions; and
said M waveguides are merged into a second single output waveguide by an optical multiplexer after being coupled with said first single waveguide.

19. A CDMA encoder-decoder comprising:
an arrayed-waveguide grating having a plurality of input and output parts, and inputting and outputting a signal;
a plurality of variable delay lines of which input parts are connected to the output parts of said arrayed-waveguide grating; and
optical reflectors connected to the output parts of said variable delay lines,
wherein said variable delay lines comprise one asymmetrical Mach-Zehnder interferometer or cascaded asymmetrical Mach-Zehnder interferometers in series having the same optical path length differences,
wherein each of said optical reflectors comprises a loop-form waveguide which is formed by connecting two portions of one waveguide at one position so that these portions are arranged close to each other, a grating, or a waveguide having a metal or a dielectric multilayered film at its end.

20. A CDMA encoder-decoder comprising:
an arrayed-waveguide grating having a plurality of input and output parts, and inputting and outputting a signal;

a plurality of variable delay lines of which input parts are connected to the output parts of said arrayed-waveguide grating; and optical reflectors connected to the output parts of said variable delay lines, wherein said variable delay lines comprise cascaded asymmetrical Mach-Zehnder interferometers in series and at least one of said asymmetrical Mach-Zehnder interferometers has an optical path length difference different from those of the others, wherein each of said optical reflectors comprises a loop-form waveguide which is formed by connecting two portions of one waveguide at one position so that these portions are arranged close to each other, a grating, or a waveguide having a metal or a dielectric multilayered film at its end.

21. The CDMA encoder-decoder according to claim 20, wherein said K, an integer equal to or more than two, asymmetrical Mach-Zehnder interferometers have optical path length differences which are $2^1, 2^2, \ldots,$ and $2^{K-1}$ times the minimum optical path length difference.

22. A CDMA encoder-decoder comprising:

an arrayed-waveguide grating having a plurality of input and output parts, and inputting and outputting a signal;

a plurality of variable delay lines of which input parts are connected to the output parts of said arrayed-waveguide grating; and optical reflectors connected to the output parts of said variable delay lines, wherein said variable delay lines, comprise a multiplexer and a demultiplexer;

said multiplexer and demultiplexer are connected by a plurality of variable delay lines with different lengths, an optical switch is disposed on each of said plurality of delay lines, wherein each of said optical reflectors comprises a loop-form waveguide which is formed by connecting two portions of one waveguide at one position so that these portions are arranged close to each other, a grating, or a waveguide having a metal or a dielectric multilayered film at its end.

23. A CDMA encoder-decoder comprising:

an arrayed-waveguide grating having a plurality of input and output parts, and inputting and outputting a signal;

a plurality of variable delay lines of which input parts are connected to the output parts of said arrayed-waveguide grating; and optical reflectors connected to the output parts of said variable delay lines, wherein said variable delay lines comprise as many as M, an integer equal to or more than two, coupling-coefficient-variable directional couplers that connect a first single waveguide to as many as M waveguides at as many as M different positions; and said M waveguides are merged into a second single output waveguide by an optical multiplexer after being coupled with said first single waveguide, wherein each of said optical reflectors comprises a loop-form waveguide which is formed by connecting two portions of one waveguide at one position so that these portions are arranged close to each other, a grating, or a waveguide having a metal or a dielectric multilayered film at its end.

* * * * *

UNITED STATES PATENT AND TRADEMARK OFFICE
CERTIFICATE OF CORRECTION

PATENT NO. : 6,711,313 B2
DATED : March 23, 2004
INVENTOR(S) : Takaguchi et al.

It is certified that error appears in the above-identified patent and that said Letters Patent is hereby corrected as shown below:

Column 16,
Lines 13-39, claims 5-8 should be deleted.

Column 17,
Line 21, "variable" should be deleted;
Line 44, "arrayed-wave guide" should read -- arrayed-waveguide --;
Line 46, "part" should read -- parts --;
Line 48, "arrayed-wave guide" should read -- arrayed-waveguide --.

Column 18,
Line 24, "variable" should be deleted;
Line 29, "rating" should read -- grating --;
Line 30, insert -- and outputting -- after "inputting";
Line 31, insert -- a plurality of variable -- before "delay";
Line 32, "arrayed wave guide" should read -- arrayed waveguide --;
Line 32, insert -- of said -- after "part".

Column 19,
Line 29, please start a new line after the first "lines";
Line 29, "," after the second "lines" should be deleted;
Line 32, "variable" should be deleted.

Column 20,
Line 33, insert the following:

--24. A CDMA communication system comprising:
the CDMA encoder-decoder according to any one of claims 1 to 4, 9, 10, 12 to 15, 17 to 20, 22 and 23:
encoders and decoders including a plurality of said CDMA encoders and decoders; and
means for multiplexing and demultiplexing light and a means for transmitting light are disposed between said encoders and decoders.

25. The CDMA communication system according to claim 24, wherein said encoders and decoders comprise an arbitrary combination of a plurality of said CDMA encoders and decoders.

26. A WDM-CDMA communication system comprising:
a WDM communication system including the CDMA encoder-decoder according to any one of claims 1 to 4, 9, 10, 12 to 15, 17 to 20, 22 and 23;
wherein a plurality of said CDMA encoders and decoders are used for encoding and decoding each of a plurality of signal wavelengths; and
means for multiplexing and demultiplexing light and a means for transmitting light are disposed between said encoders and decoders.

UNITED STATES PATENT AND TRADEMARK OFFICE
CERTIFICATE OF CORRECTION

PATENT NO. : 6,711,313 B2
DATED : March 23, 2004
INVENTOR(S) : Takaguchi et al.

It is certified that error appears in the above-identified patent and that said Letters Patent is hereby corrected as shown below:

Column 20, (cont)
  27.  The WDM-CDMA communication system according to claim 26, wherein said CDMA encoders and decoders comprise an arbitrary combination of a plurality of said CDMA encoders and decoders.--

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,711,313 B2  Page 1 of 1
DATED : March 23, 2004
INVENTOR(S) : Takiguchi et al.

It is certified that error appears in the above-identified patent and that said Letters Patent is hereby corrected as shown below:

Column 17,
Lines 13 and 14, "arrayed-wave guide" should read -- arrayed-waveguide --.

Signed and Sealed this

Tenth Day of May, 2005

JON W. DUDAS
*Director of the United States Patent and Trademark Office*